United States Patent [19]
Goldstein

[11] Patent Number: 5,891,328
[45] Date of Patent: *Apr. 6, 1999

[54] MEMBRANE-FRAME FOR PROCESSES INCLUDING ELECTRODIALYSIS

[75] Inventor: Arthur L. Goldstein, Weston, Mass.

[73] Assignee: Ionics, Incorporated, Watertown, Mass.

[*] Notice: This patent issued on a continued prosecution application filed under 37 CFR 1.53(d), and is subject to the twenty year patent term provisions of 35 U.S.C. 154(a)(2).

[21] Appl. No.: 888,151

[22] Filed: Jul. 3, 1997

Related U.S. Application Data

[63] Continuation of Ser. No. 410,423, Mar. 23, 1995, abandoned.

[51] Int. Cl.6 .......................... B01D 61/46; B01D 61/50; B01D 63/00
[52] U.S. Cl. ................ 210/321.6; 210/231; 210/321.72; 210/321.75; 210/321.84; 210/638; 210/660; 204/627; 204/630; 204/632; 204/638; 204/639
[58] Field of Search ..................................... 210/231, 232, 210/321.6, 321.72, 445, 453, 321.75, 321.84, 638, 660; 204/632, 633, 634, 635, 638, 639, 627, 630, 295, 296

[56] References Cited

U.S. PATENT DOCUMENTS

| | | | |
|---|---|---|---|
| 2,799,644 | 7/1957 | Kollsman | 204/301 |
| 2,923,674 | 2/1960 | Kressman . | |
| 3,412,006 | 11/1968 | Alexander et al. | 204/630 |
| 3,900,402 | 8/1975 | Aoki | 210/321.72 |
| 4,033,850 | 7/1977 | Kedem et al. | 204/632 |
| 4,124,478 | 11/1978 | Tsien et al. | 210/321.72 |
| 4,752,373 | 6/1988 | Korngold | 204/638 |
| 4,804,451 | 2/1989 | Palmer | 204/633 |
| 4,931,160 | 6/1990 | Giuffrida | 204/632 |
| 5,066,375 | 11/1991 | Parsi et al. | 204/632 |
| 5,120,416 | 6/1992 | Parsi et al. | 204/632 |
| 5,185,048 | 2/1993 | Guerif | 210/321.6 |
| 5,203,976 | 4/1993 | Parsi et al. | 204/632 |
| 5,512,173 | 4/1996 | Uchino et al. | 204/632 |

OTHER PUBLICATIONS

Korngold, E., *Desalination*, 16 (1975) pp. 225–223.
"Electro–Regeneration of Ion–Exchange Resins" Final Report of Southern Research Institute to Artificial Kidney–Chronic Uremia Program of the National Institute of Arthritis and Metabolic Diseases PB 210,163 (1972).
Lacey et al., *U.S. Office of Saline Water Rep.*, 398 (1971).
Nishiwaki in "Industrial Processing with Membranes", eds. Lacey and Loeb, Wiley Interscience (1972), pp. 83–106.
Garza et al., (1976), *Proc. 5th Symp. on Fresh Water from the Sea*, 3, 79–87.
Kedem, O., et al., (1978), *Desalination*, 24, 313–319.
Kedem, O., et al., (1983), *Desalination*, 46, 291–298.
Govindan et al., (1975), *Indian J. of Technology*, 13, 76–79.
Lacey in "Industrial Processing with Membranes", eds. Lacey and Loeb, Wiley Interscience (1972), pp. 3–21, 178–189.

*Primary Examiner*—John Kim
*Attorney, Agent, or Firm*—Lappin & Kusmer LLP

[57] ABSTRACT

An integral, monolithic frame-membrane is disclosed, such frame-membrane having a semi-permeable membrane portion and integral therewith a frame portion, the frame portion having one or more cavities, each cavity juxtaposed to the membrane portion, each cavity having at least one fluid entrance conduit communicating with an entrance manifold aperture and at least one fluid exit conduit communicating with an exit manifold aperture. The integral, monolithic frame-membrane may be used in apparatus for carrying out gas-separation; microfiltration; ultrafiltration; nanofiltration; reverse osmosis (i.e. hyperfiltration); diffusion dialysis; Donnan dialysis; electrodialysis (including filled-cell electrodialysis; i.e. electrodeionization); pervaporation; piezodialysis; membrane distillation; osmosis; thermo osmosis; and electrolysis with membranes. Also disclosed are pillows prepared from ion exchanging films or fabrics (which may be porous or non-porous), the pillows filled with ion exchange structures such as beads, fibers, fabrics or rods. The pillows may be used with the integral, monolithic frame-membranes, with separate frames and membranes or with frames only.

15 Claims, 5 Drawing Sheets

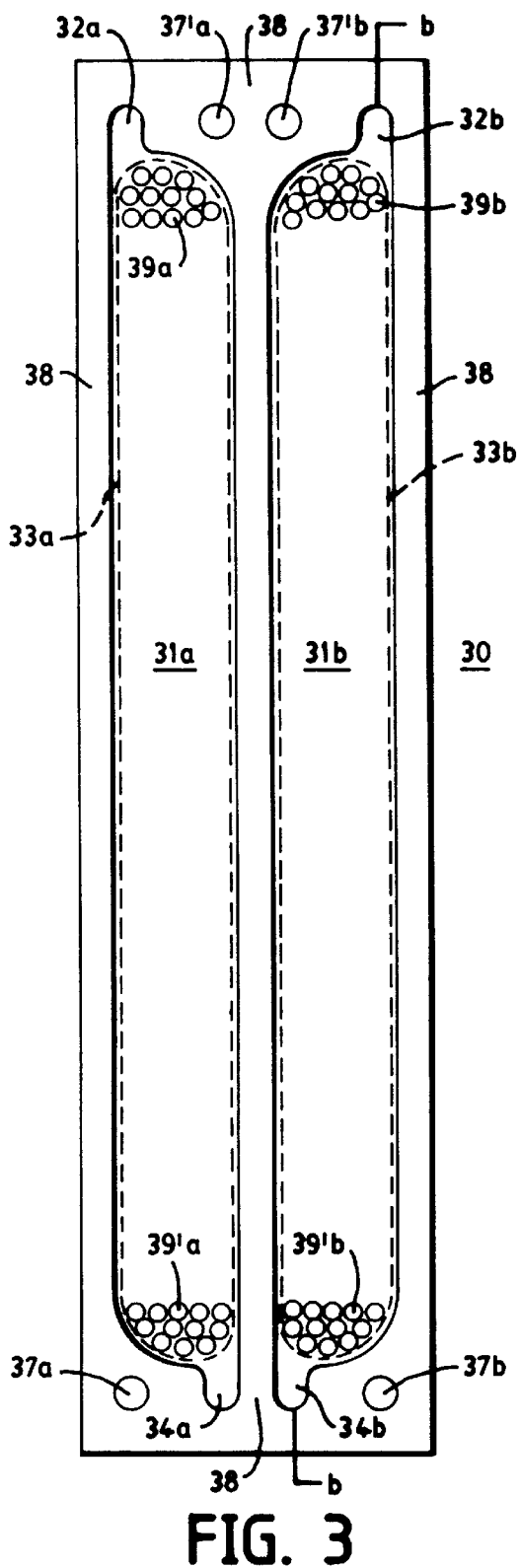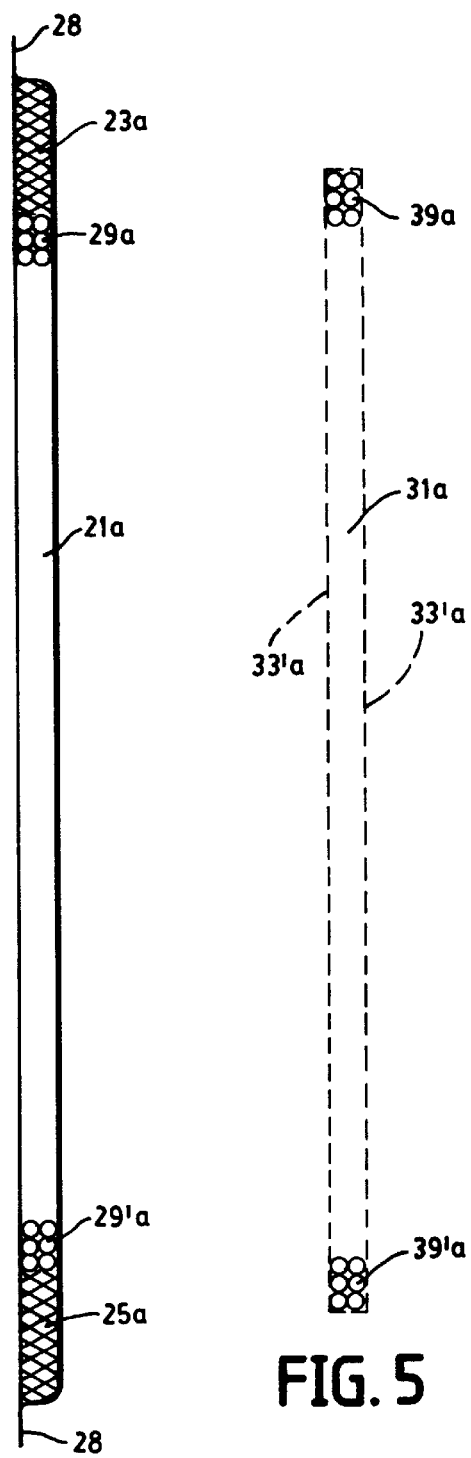
FIG. 3  FIG. 4  FIG. 5

MEMBRANE-FRAME FOR PROCESSES INCLUDING ELECTRODIALYSIS

This application is a continuation of application Ser. No. 08/410,423, filed Mar. 23, 1995, abandoned.

1. BACKGROUND OF THE INVENTION

In "multi-compartment electrodialysis" ("ED") many ion exchange ("IX") membranes are arranged between a single pair of electrodes. The membranes are of two types: cation exchange membranes ("CXM") and anion exchange membranes ("AXM"). The CXM are relatively permeable to positively charged, low molecular weight ions and relatively impermeable to negatively charged ions and to high molecular weight neutral molecules whereas AXM are relatively permeable to negatively charged, low molecular weight ions and relatively impermeable to positively charged ions (and also to high molecular weight neutral molecules). The CXM and AXM alternate between the above mentioned single pair of electrodes. Spaces are left between the membranes through which are passed aqueous solutions. When a direct electric current is passed between the electrodes, positively charged ions in the solutions ("cations", generally metallic ions such as sodium, magnesium, calcium) are pulled toward the negatively charged electrode ("cathode"). Small cations easily pass through CXM but not through AXM. Simultaneously negatively charged ions in the solutions ("anions", generally non-metallic ions such as chloride, nitrate, bicarbonate, fluoride, sulfate) are pulled toward the positively charged electrode ("anode"). Small anions easily pass through AXM but not through CXM. As a result, spaces which are on the cathode side of AXM (on the anode side of CXM) are at least partially deionized by the direct electric current. Such spaces are generally called "diluting" spaces. Spaces which are on the anode side of AXM (on the cathode side of CXM) accumulate the ions removed from the diluting spaces. Such enriched spaces are generally called "concentrating" spaces. ED is made continuous by flowing the solutions between the membranes. In such case the spaces must be enclosed by frames ("spacers") to prevent mixing of the solution in the diluting spaces ("dilute solution" or "dilute") with that in the concentrating spaces ("concentrate solution" or "concentrate"). Holes are provided in the membranes registering with similar holes in the frames thereby forming (internal) manifolds to distribute the solutions to the appropriate spaces (cavities in the frames) and to collect separately the dilute and concentrate solutions. Channels in the frames which enclose the concentrating spaces connect such spaces with the concentrate solution manifolds, and channels in the frames which enclose the diluting spaces connect the latter spaces with the dilute solution manifolds. The channels and/or frames are arranged (designed) so that the flows of solutions are uniform over the surfaces of the membranes. Regions in the diluting spaces in which the solution velocity is lower than average will be more highly deionized than the average extent of deionization. Regions in the concentrating spaces in which solution velocity is lower than average will be more enriched (concentrated) than average. If the solution being deionized contains sparingly soluble salts (such as calcium sulfate or calcium bicarbonate) then such salts may precipitate on or in those membrane surfaces in contact with regions in the concentrating spaces having velocities lower than average.

Roughly 95% of the direct electric current passing through CXM is carried by cations passing from the diluting spaces to the concentrating spaces (the remaining 5% carried by anions passing through the CXM from the concentrating spaces to the diluting spaces). The fraction of the current carried by a given ion is referred to as the "transport number". In the above case the transport number of CXM for cations is approximately 0.95. Similarly the transport number of AXM for anions is approximately 0.95 (and the transport number for cations passing through the AXM from the concentrating spaces to the diluting spaces is about 0.05). In aqueous solutions of mineral salts, the transport number for both anions and cations is roughly 0.5, that is roughly half the current is carried by anions and half by cations. For example, in the case of aqueous solutions of sodium chloride, 40% of the electric current is carried by positively charged sodium ions (i.e. transport number 0.4) and 60% by negatively charged chloride ions. Hence while 95% of the electric current is carried by sodium ions through a CXM (in the case of sodium chloride solutions) only 40% of the current is carried to the CXM by sodium ions. At the interface between the dilute solution and the CXM there is therefore a deficit in sodium ion transport equivalent to 95−40=55% of the current. Such deficit leads rapidly (in roughly one second) to a reduction in the sodium chloride concentration at the above mentioned interface to such a value that the missing 55% of the current is brought to the interface by diffusion. A mass balance leads to $$\bar{i}t = it + DF\frac{(C - C_m)}{\delta} \quad (1)$$

where "i" is the current density in amperes per cm$^2$, $\bar{t}$ is the transport number for sodium ions in the CXM (0.95), t is the transport number for sodium ions in aqueous solutions of sodium chloride (0.40), D is the diffusion coefficient (in cm$^2$ per second) for sodium chloride (not sodium ions) in aqueous solution (1.36×10$^{-5}$ at 18° C., 64° F.), F is the quantity of current required to transport one gram-equivalent of any ion at a transport number of exactly 1 (96, 480 amperes per gram-equivalent per second, called Faraday's constant), $$\frac{C - C_m}{\delta}$$

is the concentration gradient built up because of the deficit in electrical transport of sodium ions, $C_m$ is the concentration (in gram-equivalents per cm$^3$) at the above mentioned interfaces, $\delta$ is the distance (in cm) from the interface to the plane in the aqueous solution (parallel to the membrane) where the concentration is C. If the flow is in the streamline (laminar flow) region then $\delta$ is half the distance from the CXM through the diluting space to the AXM. Even when the general flow is not in the streamline region, a layer of solution adjacent to the CXM membrane remains in the streamline region, in which case $\delta$ is the thickness of such layer and C is the concentration outside such layer, essentially the bulk concentration. The above mass balance equation may be rearranged to:

$$\frac{it}{F} = D\left(\frac{C - C_m}{\delta}\right)\left(\frac{\bar{t}}{\bar{t}-t}\right) \quad (2)$$

where $$\frac{it}{F}$$

it is the quantity of sodium ions (in gram-equivalents per second per cm$^2$) transported by a current having a density of i amperes per cm$^2$. Inspection of this equation shows $$\frac{i\bar{t}}{F}$$

increases as D (the specific rate of diffusion) increases. D is inversely proportional to the viscosity of the solution and directly proportional to the absolute temperature and therefore in the case of aqueous solutions increases at a compound rate of about 2.25% per °C. Therefore there is an advantage to operating at elevated temperatures. The electrical energy consumption (in watt-seconds per gram-equivalent of sodium ion removed through a CXM) is IRF/$\bar{t}$ where (as mentioned above) i is in amperes per cm², F is the quantity of current required to remove 1 gram-equivalent per second of sodium ion through a CXM having a transport number of exactly 1 (96,480 amperes per gram-equivalent per second), $\bar{t}$ is the actual transport number of the CXM and R is the sum of the electrical resistances per cm² of one CXM, one AXM, one diluting space and one concentrating space. R decreases at a compound rate of about 2% per °C. (i.e. the same rate at which the viscosity of water decreases), increasing the importance of operating at elevated temperatures. Almost all of the electrical energy consumption goes into heating the dilute and concentrate solutions. Therefore it is often practical to warm those solutions by recuperative heat exchangers, transferring heat from the effluent solutions to the influent solutions. If the electrical energy used in ED is generated locally (e.g. by a diesel electric generator or a packaged stream electric generator) then the waste heat may be used to elevate the temperatures of the influent solutions at least enough to make recuperative heat exchange practical.

Further inspection of the above equation (2) shows that i$\bar{t}$/F increases as $\bar{t}/(\bar{t}-t)$ increases as illustrated in the following table:

| $\bar{t}$ | $\bar{t}/(\bar{t}-t)$ | Relative i$\bar{t}$/F | Relative i | Relative Energy |
|---|---|---|---|---|
| 0.95 | 1.73 | 1.00 | 1.00 | 1.00 |
| 0.85 | 1.89 | 1.09 | 1.22 | 1.37 |
| 0.75 | 2.14 | 1.24 | 1.57 | 1.99 |
| 0.65 | 2.60 | 1.51 | 2.20 | 3.22 |
| 0.55 | 3.67 | 2.12 | 3.67 | 6.33 |
| 0.45 | 9.00 | 5.21 | 11.00 | 23.2 |

The third column in the above table ("Relative i $\bar{t}$/F") is the relative amount of sodium ion removed per cm² per second, other things on the right hand side of above equation (2) being equal (i.e. C, $C_m$, D (which is a constant for sodium chloride dependent only on temperature) and δ). The fourth column ("Relative i") is the relative current density (in amperes per cm²) corresponding to $\bar{t}$ and i$\bar{t}$/F while the last column ("Relative Energy") is the relative energy (watt-seconds per gram-equivalent sodium ion removed) other things on the right hand side of equation (2) being equal. It will be seen that, except for the case where very few gram-equivalents of sodium must be removed, it may not be practical to increase i$\bar{t}$/F (the rate of removal of sodium ion) by increasing $\bar{t}/(\bar{t}-t)$. (Water having 584 ppm sodium chloride has 10 gram-equivalents of sodium per cubic meter (1 cubic meter=1 metric tonne=264 U.S. gallons)).

Inspection of equation (2) also shows that i$\bar{t}$/F (the rate of removal of sodium ion in gram-equivalents per cm² per second) increases as δ decreases. (δ is the distance (in cm) from the interface between the CXM and the solution to the plane in the aqueous solution (parallel to the membrane) where the concentration is C). In many respects, δ is only an adjustable constant which correlates the data and cannot otherwise be measured. It correlates with a similar "δ" (but is not the same as) derived from liquid momentum transfer to the membrane (viscosity loss due to friction at the membrane). It also correlates with (but is not the same as) a similar δ derived from heat transfer from solution to the membrane. δ for diffusion of sodium chloride to a membrane, is about 0.05 cm for non flowing solutions (apparently due to gravitational convection caused by density differences, in turn caused by concentration and temperature differences). If the distance from the CXM through the dilute solution to the AXM is 0.01 cm then, even when the flow of dilute solution is in the streamline (laminar flow) region, δ will be 0.005 cm. (Such CXM/AXM separation seems never to have been tried; no doubt there are interesting engineering problems associated with such small separation but there are no fundamental reasons why such is not possible). Values of δ of 0.005 cm are achieved in tortuous path spacers in use commercially from 1954. Such spacers have thicknesses of 0.1 cm (the distance from the CXM to the AXM is 0.1 cm) and have rectangular barriers 0.05 cm thick spaced about 1.4 cm from each other. The barriers alternate from the CXM side to the AXM side. Other spacers are in use or have been in use which use no barriers at all or use barriers provided by screens, expanded plastic sheet or perforated and corrugated plastic sheet. Non-woven screens having a close spacing between strands and oriented to make the flow direction change very frequently by 90° angles, easily result in δ of about 0.001 cm (and therefore in much increased i$\bar{t}$/F, other things in equation (2) being equal). Spacers may be rated by the pressure loss per linear cm to achieve a certain δ. on such basis the tortuous path spacers, referred to above, are quite inefficient. This is apparently due to the relatively large pressure losses at the trailing edge of the rectangular barriers, the turbulence resulting therefrom being rapidly damped out before the next barrier in the flow path is reached. The non-woven screens referred to above (oriented to cause frequent 90° changes in flow direction) are much more efficient in terms of i$\bar{t}$/F achieved for a given pressure loss per cm flow path length. Most efficient seem to be spacers without any barriers operating in the turbulent flow regime for which δ of 0.0005 cm seems readily achievable. δ is apparently insensitive to temperature.

Additional inspection of equation (2) shows that i$\bar{t}$/F increases as $C_m$ (the concentration at the membrane-solution interface) decreases. $C_m$ can, in principle, never be less than zero. When $C_m$ is so small that it can be neglected in terms of C for practical purposes, then equation (2) may be written $$i\bar{t}/FC = \frac{D\bar{t}}{\delta(\bar{t}-t)} \quad (3)$$

i$\bar{t}$/FC is then said to have its "limiting value". Equation (3) points out that when $C_m$ may be neglected in terms of C then i$\bar{t}$/FC is determined only by D (the diffusion coefficient of sodium chloride), $\bar{t}$ (the transport number of sodium ions in the CXM), t (the transport number of sodium ions in solution) and δ (the thickness of the laminar flow layer adjacent to the CXM or half the distance to the AXM, whichever is smaller). When D, $\bar{t}$, t and δ are constant, i (said in this case to be the "limiting i") is proportional to C (the concentration of sodium chloride at the mid point between the CXM and the AXM in the diluting space). It is apparent experimentally that $C_m$ never actually becomes zero. The concentration gradient across the laminar flow layer adjacent to the CXM is constant, i.e. the concentration of sodium chloride decreases linearly with distance to the CXM through such layer. As a result, when $C_m$ may be neglected compared to C, there is a (non-linear) electrical potential drop of a few tenths of a volt across the laminar flow layer. The on-set of such a potential drop is most easily seen by plotting E/i versus 1/i (where E/i is the apparent resistance of a cell pair (one diluting space, one CXM, one concentrating space and one AXM)). Such a technique was first used by Cowan and Brown. A plot of E/i versus 1/i shown in FIG. 1A.

The i corresponding to the inflection point (1) is generally referred to as the "limiting current density" and may be regarded as the current density at which $C_m$ first becomes negligible compared to C. $C_m$ actually reaches its steady-state value (close to but not at zero) at inflection point (2). FIG. 1A shows that as i increases (1/i decreases), it reaches a "plateau" at point (1) where it is essentially constant while E (and R) increase (E by a few tenths of a volt as mentioned above). As i increases beyond inflection point (2) (1/i decreases below such point) the current continues to increase but at a voltage level higher by a few tenths of a volt. At such latter current, the situation in the laminar flow layer may be regarded as an essentially constant concentration gradient ($C_m$, the concentration at the interface between the CXM and the diluting solution being close to zero) and therefore resulting in an essentially constant electrical resistance. (The derivative d E/ d i will be essentially constant). The voltage difference between a 1 normal (1 gram equivalent per liter) solution of hydroxide ion and a 1 normal solution of hydrogen ion at room temperature is about 0.8 volts. Therefore as the voltage difference at the CXM-dilute solution interface approaches a few tenths of a volt, hydrogen ions from the dissociation of water will accompany the sodium ions passing from the diluting solution into the concentrating solution, an equal number of hydroxide ions passing from the interface into the diluting solution. The concentrating solution will then become slightly acidic and the diluting solution slightly alkaline. However the rate at which water can dissociate is relatively small compared to the rate at which sodium ions are typically transferred and therefore the changes in acidity and alkalinity respectively are quite small.

The above discussion seems to have covered all that can be learned from equation (2). However i is the current density locally per $cm^2$ of membrane area. If the membrane is planar and smooth then the local area is that which may be measured with a straight edge. (It is possible that, if a membrane which appears flat and smooth to the "naked eye", were looked at by an electron microscope it would appear rough on a scale of a micrometer or less. However if such roughness is small compared to $\delta$, then with respect to equation (2) the membrane is still "flat and smooth"). If the membrane has a surface texture the roughness of which is comparable with or larger than $\delta$, then the area which must be used to calculate i is not the straight edge area but the "actual area" including such roughness. (Such roughness may also contribute to converting pressure loss into decreased $\delta$). The "actual area" of a CXM may be increased also by filling the diluting space between the CXM and the AXM with cation exchange beads ("CXB"). The increase in area may be easily calculated from the diameter of such beads. Such filling can increase the limiting value of i $\bar{t}/FC$ by an order of magnitude or more. (The limiting value of $i\bar{t}/FC$ is that value at which for practical purposes, $C_m$ (the concentration at the interface between the CXM (and the CXB)) becomes negligible compared to C).

The above discussion of phenomena taking place at the interface between an ion exchange membrane and a dilute solution was confined to CXM. The phenomena at an AXM are quite similar, with two exceptions. The first exception arises because the transport number of chloride ions in aqueous solution is 0.6 whereas (necessarily) the transport number of sodium ions is 0.4. Using equation (2), $$\frac{i\bar{t}}{F} = D\left(\frac{C - C_m}{\delta}\right)\left(\frac{\bar{t}}{\bar{t} - t}\right),$$

where in this case i $\bar{t}/F$ is the rate of transfer of chloride ions through an AXM, D (as before) is the diffusion constant of sodium chloride in aqueous solution, t is 0.6, the following table may be constructed:

| $\bar{t}$ | $\bar{t}/(\bar{t} - t)$ | Relative $i\bar{t}/F$ | Relative i | i Compared to CXM at $\bar{t}$ = 0.95 |
|---|---|---|---|---|
| 0.95 | 2.71 | 1.00 | 1.00 | 1.57 |
| 0.85 | 3.40 | 1.25 | 1.40 | 2.20 |
| 0.75 | 5.00 | 1.84 | 2.33 | 3.67 |
| 0.65 | 13.00 | 4.79 | 7.00 | 11.00 |

The last column shows that, comparing an AXM having $\bar{t}=0.95$ with a CXM having $\bar{t}=0.95$, C, $C_m$, D and $\delta$ being the same, the current density at the AXM is 57% higher than in the case of a CXM. This means that the current density at an AXM can, in this case, be 57% higher before $C_m$ becomes negligible for practical purposes compared to $C_m$. Column 3 (Relative $i\bar{t}/F$) shows that utilizing an AXM having $\bar{t}$ of 0.75 increases the relative transport of chloride ions (compared to $\bar{t}=0.95$) by a factor of 1.84 (i.e. by 84%) whereas utilizing a CXM having $\bar{t}$ of 0.75 (compared to a CXM having $\bar{t}=0.95$) resulted in an increase of sodium ion transport of only 24%. (Comparing an AXM having $\bar{t}=0.75$ with a CXM having $\bar{t}=0.75$, the transport of chloride ion compared to sodium ion at the same C, $C_m$ and $\delta$ is 57% greater).

The second exception of AXM compared to CXM arises as the voltage difference at the AXM-dilute solution interface approaches a few tenths of a volt. In this case hydroxide ions from the dissociation of water accompany the chloride ions passing from the diluting solution into the concentrating solution, an equal number of hydrogen ions passing from the interface into the diluting solution. The concentrate solution becomes alkaline and the dilute solution acidic. (The changes in alkalinity and acidity as measured by pH changes can be masked by the presence of carbon dioxide and/or bicarbonate which are pH change buffers). As the electric current is increased, in this case, the rate at which water dissociates becomes relatively large compared to the rate at which chloride ions are transferred and in fact most of the increase in current is carried by hydroxide ions passing into the concentrate solution. Therefore the changes in alkalinity and acidity can be quite large. The increase in alkalinity in the concentrate stream can result in precipitation of calcium carbonate on the concentrate side of the AXM if (as is frequently the case in "real" aqueous solutions) calcium bicarbonate is present. It is not that somehow the inherent rate of water dissociation has increased at an AXM but rather that AXM contain and/or have absorbed on their surfaces substances which catalyze the dissociation of water at the high voltage drops which exist at the AXM-dilute solution interface.

Examples are:

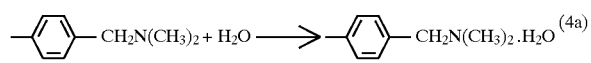
(4a)

-continued

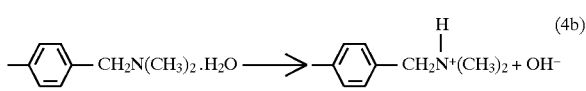 (4b)

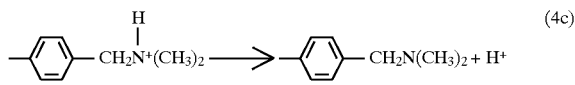 (4c)

$$-COO^- + H_2O \longrightarrow -COOH + OH^- \quad (5a)$$

$$-COOH \longrightarrow -COO^- + H^+ \quad (5b)$$

In equations (4) the

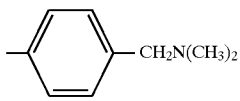

(benzyl dimethyl amine) groups result from the decomposition off

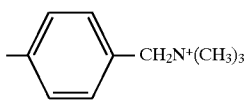

(benzyl trimethyl ammonium) groups in the surface of the AXM. —COO$^-$ (carboxylate groups) are present, for example, in the tannin like substances (generally called "humic" and "fulvic" acids) found in natural surface waters. Such tannin like substances are negatively charged and are transported (just like other anions) by the electric current to the AXM where they are strongly adsorbed, in part by multiple electrostatic attractions between positively charged groups

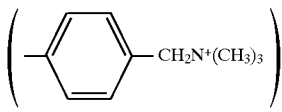

in the membrane and negatively charged groups in the tannin like substance (—COO—). Colloidal metal oxides and hydroxides (e.g. iron hydroxide) present in water are also negatively charged and behave as weak acids. It is found that AXM, containing no amine groups (other than quaternary ammonium groups) and processing water free from tannin like substances and colloidal metal oxides and hydroxides, dissociate water in essentially the same amounts as CXM. Commercial CXM contain sulfonic acid groups (—SO$_2$H) which are strongly dissociated so that reaction (5a) does not take place, Most aqueous solutions do not contain positively charged organic or inorganic colloids so reactions similar to reaction (4) above do not generally occur from absorbed substances. It is possible however to make CXM which do catalyze water dissociation by incorporating in the CXM weakly basic and/or weakly acid groups. Whether in AXM or CXM, the most effective catalytic groups have ionization constants which are equal to the square root of the ionization constant of water ($10^{-14}$), that is to $10^{-7}$. This may be seen by noting that $10^{-7}$ makes the rates of reactions (4b) and (4c) equal. It is possible to make AXM which do not have weakly basic (or weakly acid) groups and in which the bound positively charged anion exchange groups do not decompose into weakly basic (or weakly acid) groups. Such membranes, when processing clean water, will dissociate water only to the same extent as commercial sulfonate type CXM. Negatively charged organic and inorganic colloids may be removed by pretreatment of the solution with ultrafiltration or salt regenerated anion exchange with highly porous anion exchange resin granules.

The "actual area" of an AXM may be increased by filling the diluting space between the AXM and the adjacent CXM with anion exchange resin beads ("AXB"). Such filling can increase the limiting value of $\overline{\text{i}}/FC$ by an order of magnitude or more. (The limiting value of $\overline{\text{i}}/FC$ is that value at which for practical purposes $C_m$, the concentration at the interface between the solution and the AXM (and the AXB), becomes negligible compared to C). The diluting space may be filled with AXB by pumping a dilute slurry of AXB into such diluting space or by filling the space with AXB before assembling the cell pair. (A "cell pair" consists of one AXM, one diluting space, one CXM and one concentrating space). Since water dissociation is most important at AXM (and AXB) there is merit in filling the diluting space solely with AXB. If it is desired to utilize both AXB and CXB granular resins in the diluting space then it is important to have as many AXB paths back to the AXM and CXB paths back to the CXM respectively, as possible. When the diluting space is filled before assembly of the cell pair such maximization of paths may be accomplished by spreading a layer of AXB on the AXM and then a layer of CXB on the AXB (or, of course, CXB on the CXM and AXB on the CXB). When the diluting space is filled by pumping, such maximization of paths may be accomplished by alternating dilute slurries of AXB and CXB, the resulting filled space then consisting of alternating layers of AXB and CXB (in the direction of fluid flow), each layer perhaps only a few beads thick. Alternatively the space between the AXM and CXM in the diluting space may be divided by a highly porous screen, expanded plastic sheet or diaphragm and AXB pumped in on the AXM side and CXB on the CXM side.

Even with such filling of the diluting space with ion exchange resin beads, it is still possible to arrive at current densities at which the concentration of salt at the membrane-dilute solution and bead-dilute solution interfaces approaches zero. If the current density is increased still further water will be dissociated at the solution-AXB and solution-AXM interfaces into hydroxide ions and hydrogen ions as discussed above. The hydrogen ions will enter the CXB and CXM along with other cations. Another, closely related, mechanism for water dissociation also exists which may be visualized by imagining a diluting space of zero thickness, i.e. the distance between the AXM and the CXM is zero. This is equivalent to a diluting space which is essentially instantly deionized and $C_m$ at the AXM-CXM interface approaches zero essentially instantly. When the voltage drop at such interface reaches a few tenths of a volt water will be dissociated at the AXM surface into hydroxide ions and hydrogen ions, the former ions passing through the AXM and the hydrogen ions through the CXM. (Such a zero thickness diluting space is called a "bipolar junction" and the pair of AXM and CXM with zero gap is called a "bipolar" membrane. Commercial bipolar membranes contain at the interface between the AXM and the CXM a thin layer of colloidal metal oxides and/or polymeric organic weak bases and/or weak acids to catalyze water splitting). A similar situation exists whenever there is an interface between AXM or AXB and CXM or CXB in which the AXM or AXB is generally on the anode (positive electrode) side of such interface (junction) and the voltage drop across such interface is several tenths of a volt. (If the AXM or AXB is generally on the cathode (negative electrode) side of such junction, then the junction acts like a zero gap concentrating space and very concentrated salt solution (e.g. 15%) will accumulate at the junction). There seem to have been no experiments to determine which water dissociation mechanism predominates at current densities much above the limiting $\overline{it}/FC$, that is, which predominates: water dissociation (a) at AXM and/or AXB-solution interfaces or (b) at AXM and/or AXB junctions with CXM and/or CXB.

In commercial ED apparatus in which the diluting spaces are filled with IX resin beads, such beads seem always to have been a random mixture of equal gram-equivalents of AXB and CXB, that is about 60 parts of AXB to 40 parts CXB, apparently on the impression that such filled diluting spaces are an electrically regenerated mixed bed ion exchange deionizer. It is true that when the current density is far above that corresponding to the limiting $\overline{it}/CF$ (so that most of the electric current is carried by hydroxide and hydrogen ions) then the AXB and CXB will be largely in the hydroxide and hydrogen ion forms respectively. This may be proved by turning off the electric current whereupon solution passing through the filled diluting space will continue to be deionized (if the solution is dilute, then for some hours). However it is clear that when the dilute space is filled with a random mixture of IXB the objective is to maximize the number of AXB which are connected to the AXM and simultaneously the number of CXB which are connected to the CXM. If the AXB and the CXB have the same size such maxima clearly occurs (in a random mixture) when the volume (or number) ratio is 1:1. (Preferably the conductivities of the AXB and CXB will be the same under actual use conditions. The conductivities depend in known ways on the ionic form of the IXB, the water content and ion exchange capacity. Since the ionic form of the IXB may vary substantially from the entrance of a filled dilute space to the exit of such space, it may be preferred to vary continuously or step-wise the water content and IX capacity of the IXB from the entrance to the exit. It is also advantageous if one or both IXB are short-diffusion-path IXB ("SDP" or shell-and-core IXB), i.e. IXB in which the outer regions contain a normal concentration of groups and the inner regions contain a much lower (including zero) concentration). If the diameter of the beads is the same as the distance between the AXM and the CXM then all the beads are in contact with both membranes. For other ratios of bead diameter to AXM-CXM gap and for given ratios of number of AXB to CXB a computer program can be devised to calculate the number of AXB which are connected (through other AXB) to the AXM, the number of CXB connected to the CXM and the (harmonic) mean length of the AXB and CXB paths. *It may be possible to study such problem experimentally, for example by using a mixture of AXB and inert beads of the same diameter between a single pair of AXM, measuring the electrical resistance as a function of membrane gap and the ratio of the number of beads of each type. (It may also be possible to study the problem by using a mixture of copper beads and insulating glass or ceramic beads between a pair of copper plates).

It is generally accepted that whatever IXB are used, the diameters should all be the same. It is also clear that the surface area of IXB per cm³ of beads is inversely proportional to the diameter of the beads. The pressure drop per unit flow path length obviously also depends inversely upon bead diameter. IXB used for water softening or chemically regenerated deionization typically have diameters of about 0.05 cm. (Such typical bead size is obviously a compromise among practical pressure loss in an IX bed; duration of exhaustion run; and limiting exchange rate (i.e. avoiding control of such rate by diffusion in the IXB). Filled cell ED clearly involves a different compromise). Although such diameters (0.05 cm) have also been typically used in ED having diluting spaces filled with IXB, it is not clear that such diameters are optimum for ED. Very much smaller diameters are used for chromatographic analysis.

IXB are available in so called "gel" types in which the beads are transparent (but generally colored) and in "macroporous" ("macroreticular") types in which the beads are opaque. The gel types have water and IX groups more or less uniformly distributed throughout the bead. The (tortuous) pores typically have diameters of about 0.002 micrometer, varying however with the water content.

The macroporous types have comparatively large pores (e.g. 0.1 to 1 micrometer), the IX resin with its IX groups forming the walls of such pores. Diffusion in the large pores is very rapid. The water content of the resin of the pore walls is not generally reported though in principle it is measurable. The water content of the gel type IXB is generally varied by varying the amount of crosslinking monomer (for example divinyl benzene) used during suspension polymerization of the beads (for example from a mixture of styrene and divinyl benzene). The polymerized beads are treated with sulfuric acid to introduce sulfonic acid groups thereby producing CXB or with chloromethyl methyl ether and subsequently with a tertiary amine (e.g. trimethyl amine or hydroxyethyl dimethyl amine (also called dimethyl ethanol amine)) to introduce quaternary ammonium groups (e.g.

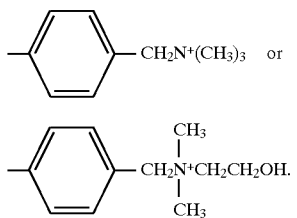

Beads containing such IX groups swell when immersed in water, the loser the amount of crosslinking and the higher the concentration of IX groups the greater the amount of swelling. The most widely used gel type CXB are made from a mixture of styrene and 8% divinyl benzene (100% basis) although such CXB are also available commercially with 1 to 12% or more DVB. It has been shown that only about half the DVB in such beads is actually involved in crosslinking. However during polymerization as described above, the growing polymer chains become heavily entangled with each other, such entanglement also reducing swelling in water. The most widely used gel type AXB are made from a mixture of styrene and 6% divinyl benzene (100% basis) although such AXB are also available commercially with less or with more DVB. The same comments with respect to efficiency of use of DVB and entanglement apply also to AXB. In addition the treatment with chloromethyl methyl ether (chloromethylation) introduces some methylene crosslinks depending upon the treatment conditions e.g. the catalyst used. (It is also possible to introduce sulfone crosslinks in CXB, depending upon the method of sulfonation used). It is also possible to make gel type IXB by diluting the styrene and divinyl benzene with a non-polymerizable solvent such as diethyl benzene and using comparatively larger amounts of DVB. In such case the swelling of the IXB in water is determined by such solvent, the volume of water absorbed being essentially equal to the volume of solvent used. The efficiency of use of DVB is also roughly only 50% but the amount of polymer entanglement is not important.

5In dilute solutions IXB generally prefer doubly charged ions (such as $Ca^{++}$ and $Mg^{++}$ or $SO_4^=$) to singly charged ions (such as $Na^+$ respectively $Cl^-$ or $NO_3^-$) and triply charged ions (such as $Sc^{+3}$ (scandium) or $Fe(CN)_6^{-3}$ (ferricyanide anion)) to doubly charged ions. There is much confusion between "doubly charged" and "divalent" and between "triply charged" and "trivalent". Amphoteric metal hydroxides (that is metal hydroxides which can behave either as weak acids or weak bases such as cupric hydroxide, nickelous hydroxide, ferrous hydroxide, nickelic hydroxide, ferric hydroxide, aluminum hydroxide) have the same charge as their valence only in acid solutions (e.g. +2 for cupric, nickelous, ferrous, +3 for nickelic, ferric and aluminum). The alkaline earth cations ($Mg^{+2}$, $Ca^{+2}$, $Sr^{+2}$, $Ba^{+2}$) are divalent and doubly charged in essentially neutral solutions and the rare earth cations (including $Sc^{+3}$ (scandium cation) and $La^{+3}$(lanthanum cation) are trivalent and triply charged in essentially neutral solution. The preference for multiply charged ions compared to singly charged ions may be illustrated by the following reaction:

(6) $Ca_s^{++} + 2Na_r^+ \rightarrow Ca_r^{++} + 2Na_s^+$ where the subscript "s" refers to solution and the subscript "r" refers to the CXB resin phase. One can write an equilibrium constant:

(7)
$$\frac{(Ca_r^{++})(Na_s^+)^2}{(Ca_s^{++})(Na_r^+)^2} = K$$

where the quantities in parentheses are expressed in gram-moles per kilogram of water (or, what is the same, milligram-moles per gram of water). The equation may be rearranged to:

$$\frac{(Ca_r^{++})}{(Na_r^+)^2} = K\frac{(Ca_s^{++})}{(Na_s^+)^2} = Y \quad (8)$$

where K $$\frac{(Ca_s^{++})}{(Na_s^+)^2}$$

is defined as "Y" (not a constant) for ease in manipulation. The ion exchange capacity of the CXB in gram-equivalents per kilogram water (i.e. the molality) is given by:

$Q = 2(Ca_r^{++}) + (Na_r^+)$.  (9)

Then $$\frac{(Ca_r^{++})}{(Q - 2(Ca_r^{++}))^2} = Y \quad (10)$$

This is a quadratic equation which has the solution:

$$\frac{2(Ca_r^{++})}{Q} = \left(\frac{1}{4YQ} + 1\right) - \left[\left(\frac{1}{4YQ} + 1\right)^2 - 1\right]^{1/2} \quad (11)$$

For example if Y is 250 (liters/mole), corresponding for example to K=1, $Ca_s^{++}$=40 ppm and $Na_s^+$=46 ppm, then the following table may be constructed:

| Q | $2 Ca_r^{++}/Q$ | % $H_2O$ |
|---|---|---|
| 0.1 | 0.87 | 97 |
| 1.0 | 0.96 | 78 |
| 10 | 0.99 | 26 |

The second column ($2Ca_r^{++}/Q$) is the fraction of the CXB which is in the $Ca^{++}$ form, the remainder being in the $Na^+$ form. The third column (%$H_2O$) is the percent by weight of water in a CXB having a dry weight capacity of 3.5 milligram equivalents per gram of dry CXB, a typical value. The effect of Y (defined as K $$\frac{(Ca_s^{++})}{(Na_s^+)^2}$$

may be seen by setting Y=25 l/mol (consistent with K=1, $Ca_s^{++}$=400 ppm, $(Na^+)_s$=460 ppm) from which the following table may be constructed:

| Q | $2 Ca_r^{++}/Q$ | % $H_2O$ |
|---|---|---|
| 0.1 | 0.64 | 97 |
| 1.0 | 0.87 | 78 |
| 10 | 0.96 | 26 |

Although the ratio of $Ca^{++}$ to $Na^+$ in solution in the latter table is the same as in the former table, this total concentration in solution is 10 times greater in the latter table resulting in loss of preference for $Ca^{++}$ compared to $Na^+$ in the CXB. K for $Ca^{++}$ and $Na^+$ is not exactly 1 and in addition K is not exactly constant. Nevertheless the above simple calculation illustrates the principles involved. The conductivity per ion (equivalent conductivity) in the case of the CXB having only 26% water is very much less than that having 97% water (the latter having an ion conductivity essentially the same as that of water) because of friction between the ions and the polymer of the CXB in the former case (low water content) and the necessity of ions to follow a tortuous path through such resin. The ratio of the conductivity of $Ca^{++}$ ion to $Na^+$ ion is less in the CXB having 26% water than in that having 97% water, in part because of the electrostatic attraction of the doubly charged ion for the fixed sulfonic acid groups. Nevertheless, in ED without filling in the diluting spaces or with filling in which the CXB portion is prepared from styrene-divinyl-benzene mixtures having 8% DVB, $Ca^{++}$ is generally preferentially removed compared to $Na^+$, at least at current densities such that $C_m$ (the total concentration at the CXM and/or CXB solution interface) is not far removed from C (the concentration outside the laminar flow layer adjacent to the CXM or CXB).

Similar considerations apply to the comparative absorption and conductivity of doubly charged sulfate anions compared to singly charged chloride anions or nitrate anions in AXM or AXB. (K for nitrate ions compared to chloride ions is about 2 for most AXM or AXB). However it appears that bulky quaternary ammonium groups such as

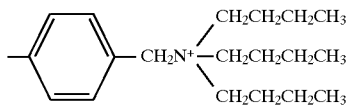

(benzyl tributyl ammonium) exclude sulfate compared to chloride (or nitrate) as compared with the common commercial quaternary group

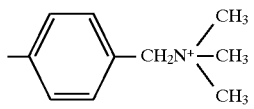

(benzyl trimethyl ammonium). Such exclusion appears to be due in part to the lack of ability of the doubly charged sulfate ion to approach closely the positively charged nitrogen atom.

The electrodialytic performance of IXM and IXB is however not determined solely by the equilibrium absorption of ions by the IXM or IXB or by the relative conductivities of the ions in the membranes or beads. It is possible to make thin skins on the surfaces of IXM and IXB which skins retard the passage of doubly and triply charged ions. (The skins have low ion exchange capacities, low water contents and low dielectric constants). Such membranes are called "univalent ion selective membranes" and are typically used to prepare 18 to 20% sodium chloride brine by ED from sea water, permitting the passage of sodium and chloride ions and inhibiting the passage of magnesium, calcium and sulfate ions. (The use of the term "univalent ion selective" is not accurate; it would be better to say "selective for singly charged ions" but since the membranes are almost always used to separate ions which have the same charge as their valency (but what is the "valency" of sulfate?) there is no practical harm in the former term). In the above concentration of seawater by ED using such skinned membranes, the current density used is far less (e.g. 50% or less) than that corresponding to the "i" in the limiting value of $\bar{it}/FC$ (that is to the "i" at which $C_m$ is negligible compared to C, the bulk concentration in the diluting space). At or above the limiting $\bar{it}/FC$ what goes through a membrane is essentially what is presented to the membrane by diffusion and conduction in the laminar flow layer adjacent to the membrane. The ratio of the ions arriving at the membrane is the ratio of the limiting $\bar{it}/FC$ that is the ratio $$\frac{D_1 C_1 \bar{t}_1}{(\bar{t}_1 - t_1)} / \frac{D_2 C_2 \bar{t}_2}{(\bar{t}_2 - t_2)}$$

Univalent anion selective membranes have been used selectively to remove nitrate from water containing also sulfate and/or bicarbonate or (with CXM which are not univalent ion selective) selectively to remove calcium chloride from water containing sodium, calcium, chloride, sulfate and bicarbonate ions. In each case the $\bar{it}/FC$ actually used is 50% or less than the limiting $\bar{it}/FC$.

It was noted above that the ratio of the conductivity of doubly charged ions compared to singly charged ions is less in IXB having low water contents than in IXB having high water contents, in part because of the electrostatic attraction of the doubly charged ions for the fixed (singly charged) ion exchange groups. It was also pointed out that bulky, quaternary ammonium anion exchange groups tend to exclude doubly charged sulfate ions in part due to the inability of the doubly charged ions to approach closely the positively charged nitrogen atom in the quaternary ammonium exchange group. One might therefore expect that such diminished electrostatic attraction would lead to greater conductance per sulfate ion at the same water content and same AXB molality (gram-equivalents of fixed, anion exchange groups per kilogram of water in the AXB). A recent report seems to confirm that sulfate is more mobile in an AXB having

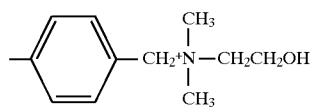

AX groups than in an AXB having

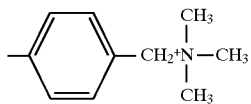

groups.

Sulfate mobility may be even higher in AXB having

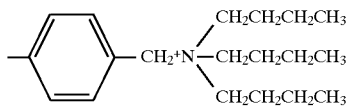

(benzyl tributyl ammonium) groups. However, as noted above, the latter groups highly exclude sulfate and therefore the relative transport of sulfate versus chloride from solutions containing both ions (at $\bar{it}/FC$ substantially less than the limiting $\bar{it}/FC$) may be poor even though the sulfate ion mobility is comparatively high. It would appear that "pleasingly plump" (rather than "bulky") groups are indicated. In addition to $(CH_3)_2N^+CH_2CH_2OH$ groups, these may include:

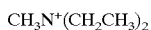

Commercial AXB are available having $N^+CH_2CH_3)_3$ groups. Such AXB appear to be macroporous and it is not known whether sulfate mobility will be the same in a macroporous AXB having such groups as compared to a gel type AXB with such groups.

All commercial ED apparatus having IXB in the diluting spaces use a mixture of AXB and CXB. All such apparatus use as CXB gel type beads having

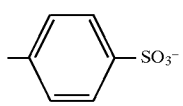

as the exchange groups, known for example as Dowex 50 (Dow Chemical Co.) or Amberlite IR120 (Rohm and Haas Co.). Most such apparatus use as AXB gel type beads having

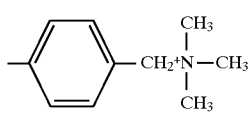

exchange groups (known as Type I groups) for example Dowex 1 or Amberlite IRA 400. The remaining commercial apparatus used (at least originally) AXB gel type beads having

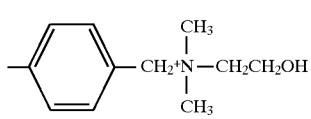

exchange groups (known as Type II groups) for example Dowex 2 or Amberlite IRA 410. In the 1960's, an in-house apparatus used a macroporous (macroreticular) AXB having Type I AX groups (Dowex 21K was actually used; similar AXB are available from other manufacturers) to supply deionized water for laboratory use.

(Macroporous (macroreticular) IXB are made, for example, from a mixture of styrene and divinyl benzene with a diluent which is a solvent for the styrene and DVB and a poor solvent for the polymer of styrene and DVB. As a result, as polymerization proceeds the polymer precipitates from solution leaving macropores. The size of the macropores depends upon the quantity of the diluent and its solubility for the polymer. A diluent may be used consisting of a mixture of a good solvent for the polymer and a poor solvent. The amount of DVB used may be the same as used in gel type IXB or less because the polymer in macroporous IXB tends to be highly entangled, the extent depending on the diluent used. With some polymeric diluents it is possible to use no DVB).

Almost all of the above discussion has pertained to the diluting space in an ED apparatus. The design of the concentrating space cannot, however, be neglected. The concentrating space should contain structure to keep the adjacent IXM flat and against whatever structure (turbulence promoting spacer or IXB) may be present in the adjacent diluting spaces. The structure in the concentrating space should also assist the adjacent IXM to resist whatever hydraulic pressure difference there may be from the diluting side of the membranes to the concentrating side. (It is common to operate the diluting space at a higher pressure than the concentrating space in order to avoid possible leaks of concentrate solution into the dilute solution). The concentrating space may be identical in structure to the diluting space e.g. have the same thickness, the same turbulence promoting structure or the same IXB. In such case the choice of which electrode of the pair (discussed above) is positive and which is negative is arbitrary. If the solution processed in the diluting space contains organic or inorganic colloidal matter and/or poorly soluble salts, then the colloidal matter can accumulate at one or the other of the diluting surfaces of the IXM and/or IXB and the poorly soluble salts at one or the other of the concentrating surfaces of the IXM and/or IXB. Regular, periodic reversal of the polarity of the electrodes will then convert a diluting space into a concentrating space and a concentrating space into a diluting space, generally effectively removing accumulated colloids and poorly soluble salts. Cycle times of 30 minutes to 2 weeks are used commercially depending upon the severity of accumulation of colloids and poorly soluble salts (that is reversing polarity every 15 minutes to one week). It is not necessary that such reversal be symmetric (that is, that each space spend equal time as a diluting space and a concentrating space). It is equally possible to operate very asymmetrically say 15 minutes in one direction and 15 seconds in the other. In the case of substantially symmetric reversal whatever structure is optimal for diluting and concentrating spaces in one direction is obviously also optimal in the opposite direction and therefore the structure (e.g. non-woven screen or IXB) should be the same in both spaces. In the case of asymmetric or no reversal the structure in the two types of spaces need not be the same. For example the distance between the AXM and the CXM in the concentrating space can be very much less than such distance in the diluting space and such thin concentrating space can have structure enabling a single pass of concentrate solution through the concentrating space without recycle (nevertheless at a pressure loss which is only slightly less than that in the diluting space) thereby avoiding the investment and operating cost of concentrate solution recycle. A single pump can be used to feed both concentrating and diluting spaces while still maintaining the desired ratio of effluent flows (i.e. percent of feed which is recovered as deionized product). Instead of (or in addition to) using concentrating spaces which are thinner than the diluting spaces (to eliminate the need for recycle of concentrate) it is possible to fill the concentrate space with IXB having a smaller mesh size (smaller diameter) than the IXB used in the diluting spaces, the smaller diameter resulting in greater hydraulic resistance. Of course attention must be paid to achieving the necessary $\delta$ in the concentrating space to assure adequate mass transfer of poorly soluble electrolytes (e.g. silicic acid (silica), calcium bicarbonate and calcium sulfate) from the interfaces between the IXM (and IXB, if such are used in the concentrating space) and the concentrating solution into the bulk of such solution.

If the diluting solution being deionized is already very dilute (e.g. 6 ppm as sodium chloride) then, even at 90% recovery of deionized dilute solution the conductivity of the concentrating solution effluent will be only about 100 micro Siemens/cm. If in such case IXB filling is used in the diluting space (which will be highly desirable to increase the effective current density in the diluting space and to decrease the electrical resistance of such space), then the principal electrical resistance of the cell pair will be in the concentrating space and it will be desirable to use IXB filling also in the latter space. Such IXB filling need not be the same as the filling in the diluting space. For example in the above mentioned filled cell ED apparatus used in-house in the 1960's, it was found advantageous to fill the concentrating spaces solely with weak base AXB.

The above discussion has concentrated on the use of IXB as filling in the diluting and/or concentrating spaces. The literature also reports apparatus in which the surface of AXM was corrugated at an angle of 45° to the direction of flow, the CXM corrugated at −45° and the corrugations of the AXM were in contact with those of the CXM. The flow was thereby forced to make frequent 90° changes in direction. Apparatus is also reported in which AX fabric was placed against the AXM in the diluting space and CX fabric against the CXM in the same space. The fabrics were knit from IX fibers. CX fibers are most easily made from polyethylene mono- or multi-filaments by soaking the latter in a mixture of styrene, divinyl benzene and free radical catalyst, polymerizing the monomers and subsequently sulfonating. AX fibers may be made by substituting vinyl benzyl chloride for the styrene and finally treating the filaments with an appropriate tertiary amine as discussed above. (IX fibers and filaments may also be made by sulfo-chlorinating polyethylene fibers and filaments, subsequently hydrolyzing or aminating and quaternizing). Such IX monofilaments may be easily bonded together by moderate heat and pressure to give non-woven screens. The latter can obviously be made on automatic machinery. The literature reports that the highest values of limiting $\overline{i}t/FC$ were obtained when there was some interpenetration of the AX knitted fabric with the CX knitted fabric. IX monofilaments or multifilaments having a diameter equal to the spacing between the AXM and the CXM may also be arranged in alternation parallel to the direction of flow.

In the above discussion limiting values of $\overline{i}t/FC$ were used as the basis of discussion since such ratio reflects the actual transfer of ions $$\left(\frac{it}{FC} = \frac{D}{\delta}\frac{t}{(\bar{t}-t)}\right).$$

In engineering practice it is common to use the ratio

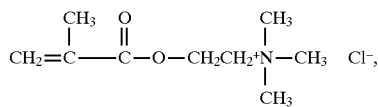

because it relates the easily measurable i and C. It does not however relate to the performance of the ED apparatus.

2. PROBLEMS ADDRESSED IN THIS APPLICATION

In commercial, serial production, ED stacks (whether or not with IXB filling in at least the diluting spaces) cost about 25% of the total assembled equipment cost in the case of small ED plants and about 50% in the case of large plants. Such stacks may consist of a thousand or more components (not including the IXB), each of which may require several manufacturing steps. IXM are generally manufactured by one of the following processes:

(a) A fabric woven from synthetic staple fiber is impregnated with a mixture of sulfoethyl methacrylate, ethyleneglycol dimethacrylate with or without divinyl benzene, a free radical catalyst and a non-polymerizable diluent. The impregnated fabric is heated to cause polymerization of the monomers. The resulting sheet is leached with dilute sodium bicarbonate solution to remove the diluent. The diluent is a good solvent for both the monomers and the polymer and the latter is therefore gel-like. The manufacturing process is essentially continuous.

(b) A fabric woven from synthetic staple fiber is impregnated with a mixture of $$CH_2=C\underset{\underset{CH_3}{|}}{\overset{\overset{CH_3}{|}}{{-}}}\overset{\overset{O}{\|}}{C}-O-CH_2CH_2\overset{\overset{CH_3}{|}}{\underset{\underset{CH_3}{|}}{N^+}}-CH_3\quad Cl^-,$$

ethylene glycol dimethacrylate, a free radical catalyst and a non-polymerizable diluent. The impregnated fabric is heated to cause polymerization of the monomers. The resulting sheet is leached with water to remove the diluent. The diluent is a good solvent for both the monomers and the polymer and the latter is therefore gel-like. The manufacturing process is essentially continuous. The AXM made by this process are not stable in caustic.

(c) A fabric woven from synthetic monofilament is impregnated with a mixture of styrene, divinyl benzene, polystyrene and a free radical catalyst. The impregnated fabric is heated to cause polymerization of the monomers. The resulting sheets are treated with sulfuric acid to introduce sulfonic acid groups thereby producing CXM or with chloromethyl ether and subsequently trimethyl amine to produce AXM. The manufacturing process is essentially continuous.

(d) A fabric woven from synthetic monofilament is impregnated with a strene-butadiene latex and allowed to dry. The impregnated fabric is treated with sulfuric acid to crosslink the polymer and introduce sulfonic acid groups thereby producing CXM or with the chlorides of metals which form weakly acidic hydroxides (such as titanium chloride) to crosslink the polymer, then with chloromethyl ether and subsequently with trimethyl amine to produce AXM.

(e) A paste is prepared from styrene, divinylbenzene, dimethyl phthalate (a non-polymerizable diluent), a free radical catalyst and powdered PVC. The paste is calendered into a fabric woven from monofilament. The thus impregnated fabric is heated to cause polymerization of the monomers. The resulting sheet is treated with sulfuric acid to introduce sulfonic acid groups thereby producing CXM or with chloromethyl ether and subsequently trimethyl amine to produce AXM. The manufacturing process is essentially continuous.

(f) About 25 parts of polyethylene are masticated on a rubber mill and about 75 parts of IX powder are added. The mixture is calendered into and on a fabric woven from monofilament. Preferably the IX powder particles are spherical. If the IX powder is AX powder the final product is an AXM. If the IX powder particles are CXB the final product is a CXM. The manufacturing process is essentially continuous.

A typical separator between the IXM in an ED stack uses a combined frame and spacer having a tortuous flowpath. Polyethylene is extruded continuously as a sheet 0.05 cm thick. The resulting continuous sheet is cut with a rotary die to form 6 or 8 flowpaths having rectangular barriers perpendicular to the flowpath about every 2.8 cm. The pattern of the flowpath is asymmetric so that when one die cut sheet is turned over and placed on another, the barriers occur about every 1.4 cm in the flowpath, alternating from the AXM side of the flowpath to the CXM side. The two thus oriented die cut sheets are glued together manually to form a separator 0.1 cm thick. These separators are inexpensive but inefficient.

Another common separator between the IXM in an ED stack consists of a frame, for example of polyethylene, ethylene vinyl acetate copolymer, ethylene-ethyl acrylate or ethylene-acrylic acid copolymer, and a non-woven or expanded plastic screen of the same thickness in the space enclosed by the frame. The screen may simply lie on the membrane adjacent to the frame during assembly of the ED stack or the screen may be imbedded in the frame. The literature discloses many designs of screen type separators and many methods of making such. Screen type separators can be efficient. It is necessary to assure that the flow of solution through the screen type separators is uniform. At the same time it is necessary to avoid cross-leaks between concentrating and diluting spaces and to avoid by-passing of the applied direct current down the internal manifolds, particularly the concentrate solution manifold. An ED stack may be regarded as a network of electrical resistances e.g.

one path consisting of all the AXM, dilute spaces, CXM and concentrate spaces in series;

paths from each concentrating space down the entrance and exit channels of each such space, through the concentrate manifolds to the entrance and exit channels of all the other concentrating spaces and into all such spaces;

paths from each diluting space down the entrance and exit channels of each such space, through the dilute manifolds to the entrance and exit channels of all the other diluting spaces and into all such spaces. (The effluent from the diluting spaces is much more resistant than the effluent from the concentrating spaces and therefore the electric current lost through the dilute effluent manifold is much less than that lost through the concentrate effluent manifold. The influent to the diluting spaces may or may not be more resistant than the influent to the concentrating spaces. Therefore the current lost through the dilute influent manifold may or may not be less than that lost through the concentrate influent manifold);

paths laterally through each IXM to any dilute or concentrate manifold with which such IXM may be in contact.

Although such network of electrical resistances consists of hundreds of resistances in series and parallel, there are only a few elemental resistances each of which is repeated in a definite pattern in the network. Such networks have therefore been solved for the electrical current in each branch. For the sake of efficiency of the apparatus, it is generally desirable to limit the average by-pass current loss per cell pair to about 1% of the total current per cell pair. Excessive lateral currents in IXM under the spacer frames can result in serious temperature increases in such region and distortion of frames and/or membranes.

Thus the separators between IXM must:

assure equal distribution of dilute and concentrate solutions among several hundred diluting and concentrating spaces respectively;

assure uniform velocities in each diluting space and in each concentrating space;

limit leakage of solutions to the outside of the ED stack;

limit cross-leak between the dilute and concentrating solutions;

limit by-pass electrical currents. To achieve all of the above, some spacer-frames consist of:

separate frames containing holes for the internal manifolds;

separate spacers for positioning and supporting the IXM and for promoting turbulence in the flowing solutions to reduces, such spacers being inserted into the frames by hand during assembly of the ED stack;

separate inserts (for distributing solutions evenly among the respective spaces, for limiting cross-leaks and by-pass currents) inserted into the frames by hand during assembly of the ED stack.

In other spacer-frames the above functions are integrated into a monolithic structure, nevertheless often requiring several machine and/or hand operations for manufacture of each spacer frame.

As noted above, diluting and/or concentrating spaces may be filled with IXB (a) by spreading such IXB by hand or machine on one or the other IXM and within an appropriate frame or (b) by pumping such IXB into an assembled ED stack by fluidizing the IXB. Method (a) permits AXB to be layered against the AXM and CXB against the CXM, a junction between the AXB and CXB occurring somewhere between the AXM and CXM. The location of such junction may be adjusted in accordance with the characteristics of the AXB and the CXB and the composition of the solution being treated. U.S. Pat. No. 2,923,674 points out that when the diluting spaces are filled solely with CXB then, when polarization occurs it will occur at the junction between the CXB and the AXM, the concentrating solution will become alkaline and the diluting solution acidic. Furthermore when the diluting spaces are filled solely with AXB then, when polarization occurs it will occur at the junction between the AXB and the CXM, the concentrating solution will become acidic and the diluting solution alkaline. Such observation was made also by Desalination 16 (1975) 225–233 which discloses using CXB near the CXM and AXB near the AXM. Amberlite IRA 402 (Type I AXB having low crosslinking (6%) and 54% water on a wet basis, available from Rohm & Haas Co., Philadelphia, Pa.) was preferred in such configuration to IRA 400 (standard crosslinking (8%) and 45% water) because 402 has lower electrical resistance. The above Desalination publication notes that "In choosing the type of resin, interaction between bivalent and trivalent ions and the resin must be taken into account. Such interaction can dramatically increase the electrical resistance of the stack." For example such publication reported for Amberlite 120 (standard XL (8%), 45% water) and for Amberlite IRA 400 the following relative resistance (vs. $Na^+$ and $Cl^-$ forms resp.):

| Form | Relative Resistance | Form | Relative Resistance |
|---|---|---|---|
| $Na^+$ | 1.00 | $Cl^-$ | 1.00 |
| $Ca^{++}$ | 4.33 | $SO_4^-$ | 1.61 |
| $Mg^{++}$ | 5.42 | $CO_3^-$ | 1.28 |

Method (b) above (pumping IXB into assembled ED stacks) permits the IXB easily to be layered in the direction of flow through the diluting and/or concentrating space (see U.S. Pat. Nos. 5,066,375; 5,120,416; 5,203,976).

"For example:

a) the size of the particulates AX and CX can be varied along the flowpath in compartment(s) 10 . . . ;

b) the relative blend of AX and CX particulates can be varied along the flowpath. For example it is possible easily to make a multi-layered packing e.g. of alternating AX and CX particulates or the lower part of compartment 10 can contain such layered packing and the upper part randomly mixed particulates;

c) the portion of the packing in compartment 10 which is the first to contact fluid can have special properties; e.g. it can be non-ion exchange particulates or organic scavenging particulates even if such are poor electrolytic conductors or even electrical insulators." The above mentioned patents suggest that the ion exchange particulates can be beads or spheres or "any structures which provide fluid interstices and permit flow of such fluid in the interstices, for example irregular granules, thin rods preferably parallel with the surfaces of the membranes, fibers including woven or knitted fibers, saddles, rings, tellerettes, etc."

The above mentioned patents also disclose that the IXB can be removed from an assembled ED stack by reversing the direction of flow through the stack. However equipment for hydraulic removal of and refilling with IXB may not be available in the field in which case removal and refilling may be very inconvenient, sometimes requiring return of filled stacks to the factory for service.

(Some filled cell ED stacks have the spacer-frames sealed to the IX membranes (see e.g. "Electro-Regeneration of Ion-Exchange Resins" Final Report [of Southern Research Institute] to Artificial Kidney-Chronic Uremia Program of the National Institute of Arthritis and Metabolic Diseases, PB 210,163 (1972) page 55). Such stacks can of course be designed to permit filling with and removal of IXB hydraulically but if not so designed then the stacks must be returned to the manufacturer for service. The apparatus disclosed in the above mentioned Final Report operated at constant current, used IXB of substantially uniform size (e.g. Rohm and Haas Stratabed-84 and Stratabed-93) as well as Type II AXB (e.g. Amberlite IRA 410 and 910 and Duolite A-102D).

Thus it is desirable to have more convenient ways of filling ED stacks with IXB and removing such IXB from such stacks while at the same time achieving any desired geometric arrangement of the IXB. Other objects will be obvious from the following examples and appended claims.

BRIEF DESCRIPTION OF THE DRAWINGS

FIG. 3 is a schematic representation in plan view, not necessarily to scale, of a frame 30 and other pillow(s) useful in this invention, the pillow(s) also containing a body (resp. bodies) of ion exchange polymer permeable to bulk flow of fluid.

FIG. 4 is a schematic representation in side view, not necessarily to scale, of a pillow of FIG. 2.

FIG. 5 is a schematic representation in side view, not necessarily to scale, of a pillow of FIG. 3.

3. INVENTIONS ADDRESSED TO SUCH PROBLEMS

3A Integral, Monolithic Membrane—Frames

It has been pointed out above that it is desirable to reduce the number of individual components in an ED stack; to reduce the number of operations required to construct a cell pair; and to simplify the assembly of an ED stack. These and other objectives are attained by the fabrication and use of integral, monolithic membrane-frames. U.S. Pat. No. 4,804,451 discloses a filled, dilute ED compartment having a spacer adhered on one surface directly to the reinforcing fabric of an AXM and on the other surface directly to the reinforcing fabric of a CXM. The IX resin of the IXM is skived off, down to the reinforcing fabric, in the area in which the spacer will be adhered. Adherence is provided by solvent-based adhesive; by hot-melt adhesive; by direct heat weld; by thermoplastic interlays; by contact adhesive; or by pressure sensitive hot melt adhesive. It is clear that such article (and the method of manufacturing it) adds several operations to the assembly of a filled cell ED stack:

the IX resin must be skived off an IXM in a definite pattern, down to the reinforcing fabric;

adhesive must be applied to the skived areas and/or one side of a spacer;

the spacer must be adhered to the IXM;

the cavity in the spacer must be filled with IXB;

IX resin must be skived off a second IXM in a definite pattern (the mirror image of the pattern first mentioned above);

adhesive must be applied to the latter skived areas and/or the second side of the spacer; and the second IXM must be adhered to the spacer.

Such a filled, dilute ED compartment is totally sealed (except for entrance and exit channels). It does not consist of an integral, monolithic membrane-frame. Such a filled, sealed, dilute ED compartment cannot be maintained either in the field or in the factory and must be thrown away for any defect which develops which defect significantly affects performance of the filled cell ED stack.

EXAMPLE 1

Figure 1:
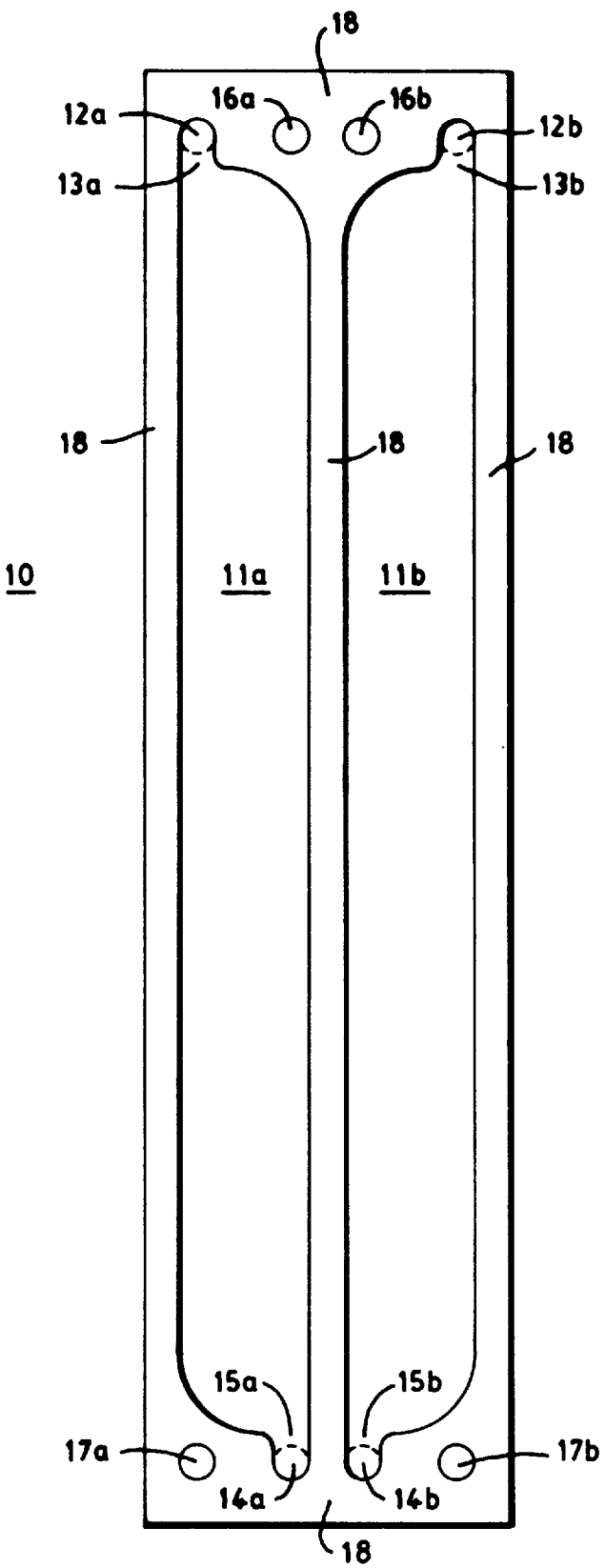
FIG. 1 is a schematic representation in plan view, not necessarily to scale, of a frame 10 useful in this invention and, in negative, of a pattern or mold for preparing such a frame.
Figure 1A:
FIG. 1A shows a plot of E/i versus 1/i for a laminar flow layer.

FIG. 1 is a schematic representation of the plan view, not necessarily to scale, of a frame 10 suitable for use, according to this invention, in ED (including reversing type ED ("EDR"); filled-cell ED ("EDI"); reversing type, filled-cell ED ("EDIR"); ED with bipolar membranes ("BPED")); reverse osmosis ("RO"); nanofiltration ("NF"); ultrafiltration ("UF"); microfiltration ("MF"); gas separation ("GS"); pervaporation ("PV"); diffusion dialysis ("DD"); Donnan dialysis ("DnD"); piezodialysis ("PD"); membrane distillation ("MD"); diffusion osmosis ("DO"); thermo osmosis ("TO") and electrolysis ("EL") and other membrane processes. In the figure, 11a and 11b are cavities in the frame 10. The frame may consist of a single cavity or many cavities even twenty or more. 12a and 12b represent manifold apertures (e.g. entrance manifold apertures, alternatively exit manifold apertures). 14a and 14b also represent manifold apertures (e.g. exit manifold apertures if 12a and 12b are entrance manifold apertures, otherwise entrance manifold apertures). 16a, 16b, 17a and 17b represent internal manifold apertures not connected with cavities 11a and 11b and forming internal manifolds for other fluid streams in the apparatus of which frame 10 is a part. 13a, 13b, 15a and 15b represent conduits communicating between the adjacent manifold apertures and the cavities. 18 (repeated several times in the figure) designates the solid material of the frame e.g. a hard polymer, a resilient polymer or a laminate of hard polymers with resilient polymers. It will be clear that a pattern or mold for making frame 10 will be the negative of FIG. 1, e.g. 18 will represent milled out portions of the pattern whereas the other numbers will represent areas not milled out.

According to this example, the pattern of the frame represented in FIG. 1 is milled into an aluminum plate. The depth of the milled out area (18 in FIG. 1) is about 3 mm. The effective area of each flow path is about 732 cm$^2$ and the flowpath length is about 84 cm. The aluminum plate is coated with polytetrafluoroethylene. A steel die is prepared having the same pattern. Acrylic non-woven fabric (Carl Freudenberg T 29516) is cut to the pattern with the steel rule die and then soaked in a mixture consisting of (all parts by volume except as indicated):

| | |
|---|---|
| Methacryloxyethyl trimethyl ammonium chloride (80% in water) [51410-72-1] | 39 parts |
| Ethylene Glycol Dimethacrylate [97-90-5] | 21 parts |
| Dipropylene Glycol | 40 parts |
| Azobisdimethyl isobutyrate | 13 grams per liter |

The pieces are drained and placed one by one in the milled-out pattern until the pattern is filled. A piece of the same fabric about 28 by 107 cm is soaked in the above mixture and placed over the pattern assuring good contact everywhere with the top-most cut piece in the pattern. A Mylar (TM duPont Co., Wilmington, Del.) sheet about 0.008 cm thick is placed over the 28×107 cm fabric and covered by a piece of flat glass about 32×110 cm. The resulting construction is heated in a recirculating air oven at 85° C. for about 4 hours to effect polymerization. It is removed from the oven, allowed to cool until it is only warm to the touch and the flat glass and Mylar film are removed. The pattern containing the integral, monolithic AXM-frame is immersed in 2N sodium chloride solution for about 1 hour. The AXM-frame is then removed from the pattern and stored in 2N sodium chloride solution. Excess AXM extending beyond the frame is removed.

EXAMPLE 2

The procedure of Example 1 is repeated except:

polyester fabric (Style 66149 from Precision Fabrics Group Inc.) replaces the acrylic fabric; and the polymerizable mix is (parts by volume except as indicated):

| | |
|---|---|
| 2-sulfoethyl methacrylate [1804-87-1] | 35 parts |
| ethylene glycol dimethacrylate [97-90-5] | 11 parts |
| 80% divinyl benzene [1321-74-0] | 11 parts |
| dipropylene glycol | 43 parts |
| azobisdimethyl isobutyrate | 20 grams/liter |

Monolithic, integral frame-membranes are also made in similar fashion to Examples 1 and 2 having "half-thickness" frames on each side of each membrane. It is found that there is less distortion in such "double sided" frame-membranes when passing from one equilibrating solution to another. Alternatively monolithic, integral frame-membranes are made having full thickness frames on each side of each membrane. It is found to be advantageous to use CXM having integral full-thickness frames on each side and standard flat AXM since in actual use the lifetimes of AXM are generally significantly less than those of CXM. Replacement costs are thereby reduced.

EXAMPLE 3

A five cell pair filled cell ED stack is assembled using integral monolithic framed membranes prepared in accordance with Examples 1 and 2. The end blocks are PVC into which has been milled recesses to accept electrodes. The electrodes are platinum electroplated titanium sheet. On the lower end block there is placed a frame made in accordance with Example 2 but omitting the 28×107 cm fabric. The open space in such electrode frame is filled with non-woven screen except that at the ends of the frame flexible urethane foam is placed to block flow from the conduits to and from the internal manifolds. The urethane foam is slightly thicker than the electrode frame. Hydraulic connections to the electrode frame flowpaths are made through the PVC end blocks and electrodes. Both concentrating and diluting spaces are filled with IXB. The areas near the entrance and exit channels are filled with non-woven screen in order to confine the IXB to the flowpaths. When, during the assembly of the stack, the membrane exposed is an AXM then about 125 ml of Purolite Purofine A-300 are spread uniformly over the exposed membrane and about 84 ml of Purolite Purofine C-100 EF are spread carefully and uniformly over the A-300. When the membrane exposed is a CXM then about 85 ml of C-100 EF are spread uniformly over such membrane and about 125 ml of A-300 carefully and uniformly over the C-100 EF. In either case the amount of the second IXB spread is that which completely fills the space.

(The Purolite IXB may be obtained from the Purolite Co., Bala Cynwyd, Pa. Purofine A-300 is a polystyrene based Type II clear gel type AXB having a water content of 40 to 45% by weight on a wet, drained basis and having about 98% of the particles in the size range 0.42 to 0.71 mm. Purofine C-100 EF is a polystyrene based gel type CXB having sulfonic acid exchange moieties, a water content of 46 to 50% by weight on a wet, drained basis and having at least 95% of the particles in the size range 0.40 to 0.60 mm).

The stack is tightly clamped together by means of steel end plates and threaded tie-rods. The stack is used further to demineralize the permeate from a reverse osmosis apparatus, which permeate has a pH averaging about 6 and an electrical conductivity averaging about 1 micro-Siemen/cm. The flow to each diluting cell is about 10 ml/sec. The feed and outlet pressures of the concentrating and electrode streams are adjusted to minimize crossleaks. The feeds and effluents of the various classes of compartments are carried through coils of long pieces of flexible tubing in order to reduce by-pass currents. A d.c. current of about 0.5 amperes is applied to the stack. It is found that the effluent from the diluting compartments has a conductivity averaging about 0.1 micro-Siemens/cm, i.e. about a 90% reduction in conductivity.

COMPARATIVE EXAMPLE 1

Frames are made in accordance with Examples 1 and 2 but in each case omitting the 28×107 cm fabric. The latter fabric is converted to normal, flat AXM and CXM by soaking pieces either in the polymerizable mix of Example 1 or that of Example 2 respectively. A piece of Mylar film (as described in Example 1) about 34 by 113 cm is carefully laid over a piece of-flat glass about 32×111 cm, removing wrinkles in the film. A piece of fabric which has been soaked as described above is laid over the film, care being taken to eliminate bubbles and wrinkles. A second piece of Mylar film is laid over the fabric followed by a second glass plate, a third Mylar film, a second piece of soaked fabric etc. until a convenient stack of glass plates, film and impregnated fabric is achieved. The resulting stack is heated as described in Examples 1 and 2, cooled and disassembled. The resulting flat membranes are stored in 2N sodium chloride solution.

A stack of five cell pairs is assembled as described in Example 3, using however the separate frames and membranes. The membranes are dye tested for leaks, trimmed to the size of the frames and holes are cut in them to form with the frames the internal manifolds for flow distribution. It is found that assembly of the filled cell ED stack is much more time consuming with the separate frames and membranes than with the integral frame-membranes of Example 3.

The stack is operated as in Example 3. It is found that the minimum crossleak attainable when the inlet and outlet pessures are carefully adjusted is larger than that obtained in Example 3. Under the operating conditions of the latter example, demineralization is found to be less than 85%.

EXAMPLE 4

In the case of the stack of Example 3, the monolithic integral frame-membranes result in a series of contacts between alternating AX and CX resin. Whenever AX resin is on the anode side of a junction with CX resin, then such junction is a demineralizing, bipolar junction. Any by-pass current through the frame portions of the integral frame-membranes will therefore result in rapid depletion of electrolyte at the above mentioned demineralizing junction. Any bypass current is therefore self-limiting at low cell-pair voltages. However when the cell pair voltage exceeds about 1 volt, sufficient potential is available to split water into hydrogen and hydroxide ions. The resulting by-pass current does not seriously detract from the feasibility of the apparatus, particularly when both concentrating and diluting cells are filled with IXB. Nevertheless it is possible to reduce such by-pass current. In this example such is accomplished by die-cutting vinyl chloride-vinylidene chloride copolymer film to the shape of the frames. The stack of Example 3 is disassembled and reassembled as in Example 3, except at those frame junctions (concentrating junctions) at which CX resin is on the anode side of the junction, a single piece of such die-cut film is placed over the composite frame-membrane.

Such operation increases the time of assembly and it is believed that a single insertion of such film at each end of the stack, or at every third or fourth concentrating junction, would significantly reduce by-pass current through the frames at high cell-pair voltages.

EXAMPLE 5

By-pass current through IX resin frames of Example 3 can be eliminated by using separate insulating frames and flat membranes. Such insulating frames require an additional molding or machining operation and double the number of pieces which must be handled as discussed in Comparative Example 1. The film inserts of example 4, even if used infrequently in a stack, increase labor cost. This example discloses an alternate procedure.

Composite frame-AXM are made as in Example 3. The frame portions of some of such composite structures are dipped in a synthetic rubber latex and allowed to drain. The frame portions of other such composite structures are painted with such latex with a roller. A stack is assembled and tested as in Example 3 using such coated frame-AX membranes and uncoated frame-CX membranes. Performance is found to be about the same as in Example 3. The coating operation is not significant compared to the assembly time of a stack. It is believed that a satisfactory reduction of by-pass current will be achieved by coating only a small fraction of the AX and/or CX composite frame-membranes.

EXAMPLE 6

Ethylene-vinyl acetate copolymer sheet having a thickness slightly greater than the depth of the aluminum pattern of Example 1 is cut to the pattern of FIG. 1 and inserted into the aluminum pattern. Yuasa Battery Co. (Tokyo, Japan) MF250B microfiltration membrane sheet having dimensions of about 28×107 cm is placed over the aluminum pattern (and copolymer) and covered with a piece of the Mylar film described in Example 1. A steel plate is placed over the film and the resulting structure heated at 85° C. for four hours. It is found that the copolymer has penetrated into the adjacent pores of the microfiltration membrane. The resulting structure is an integral, monolithic frame-microfiltration membrane and may be used as such.

The resulting framed microfiltration membrane is soaked in a mixture of (all parts by volume except as indicated):

| | |
|---|---|
| 2-sulfoethyl methacrylate [1804-87-1] | 30 parts |
| ethylene glycol dimethacrylate [97-90-5] | 16 parts |
| divinyl benzene (80%) [1321-74-0] | 16 parts |
| dipropylene glycol | 38 parts |
| azobis dimethyl isobutyrate | 10 grams/liter |

The microporous membrane of the saturated structure is thoroughly drained and covered with Mylar film described in Example 1. It is heated in an air recirculating oven at 85° C. for 4 hours, allowed to cool and stored in 2N sodium chloride solution yielding a framed CXM.

Similar results are obtained when poly(ethylene-co-ethyl acrylate) is used in place of ethylene-vinyl acetate copolymer. It is found that other resilient polymers can also be used, such as EPM rubber, thermoplastic elastomers (e.g. Kraton 1101 styrene-butadiene block copolymers (SBS); Kraton 1107 styrene-isoprene block copolymers (SIS); polyurethane elastomers; Hytrel (TM dupont) copolyester-ether elastomers); Viton A(TM dupont) poly vinylidene fluoride-co-hexa fluoropropylene; Viton B(TM dupont) poly (vinylidene fluoride-cohexafluoropropylene-co-tetrafluoroethylene); Kel-F 3700 (TM 3M Co.) poly (vinylidene fluoride-co-chlorotrifluorethylene) poly (vinylidene fluoride-co-1-hydropentafluoropropylene). It is also found that crosslinked elastomers give similar results when they are used in place of ethylene-vinyl acetate copolymer. In such case the elastomer can be crosslinked in the mold in contact with the intended microporous substrate for the membrane. The microporous substrate can subsequently be saturated with a polymerizable liquid mixture which, upon polymerization will produce an IXM.

For some choices of elastomer and polymerizable liquid mixture, the crosslinking of the elastomer and polymerization of the liquid mixture can take place simultaneously. Such choices can be easily made by those skilled in the art. In general the elastomer should be capable of crosslinking at temperatures of about 100° C. or less over periods of one to a few hours or be capable of being compounded to give such characteristic. It is also obvious that the elastomer and the polymerizable liquid mix should have limited mutual solubilities.

The polymerizable mixture recited in this example results in CXM. It may be replaced with other appropriate polymerizable mixtures, for example that of Example 1 yielding in such case an AXM. The integral frame in this example is roughly 3 mm thick including the margins of the microporous-sheet-reinforced CXM which margins are impregnated with ethylene-vinyl acetate copolymer (or other appropriate polymer as set forth above). By appropriate modification of the aluminum pattern of example I and/or by using the (positive) aluminum frame of Example 11 or in other appropriate ways obvious to those skilled in the art, the thickness of the integral frame can easily be made more or less than roughly 3 mm including having a thickness about equal to that of the IXM or even less.

EXAMPLE 7

About 50 parts by weight of polyethylene are sheeted out on a rubber mill heated at about 110° C. There are then added about 150 parts Amberlite IRA 402 (Rohm and Haas Co., Philadelphia, Pa.) in the form of beads, all of which pass through a U.S. Standard sieve No. 100. The mixture is milled at about 110° C. until the dispersion of the IRA 402 in the polyethylene is uniform. The mixture is made into thin sheets. Two such thin sheets are pressed, one from each side, into a polyethylene screen under heat and pressure to make a reinforced, heterogeneous AXM. Other sheets are cut to the pattern of FIG. 1 and several of them inserted into the aluminum pattern of Example 1 sufficient to overfill it slightly. The above reinforced membrane is placed over the aluminum pattern and covered with a piece of the Mylar film described in Example 1. A steel plate is placed over the film and the resulting structure heated until the membrane and the frame pieces in the aluminum pattern have fused together. After cooling the pattern is placed in water and the composite membrane-frame removed from the pattern and stored in 2N sodium chloride solution.

It is found that similar composite membrane frames can be made when, instead of polyethylene, there are used: a mixture of about 42 parts of polyethylene and 8 parts of poly-isobutylene; NBR rubber compounded with sulfur, zinc oxide and a non-scorching accelerator; SBR rubber similarly compounded; a copolymer of 95% vinyl chloride and 5% vinyl acetate; poly chlorotrifluoro ethylene; a mixture of about 15 parts polytetrafluoroethylene and 35 parts polyethylene; linear low density polyethylene; or polypropylene. It is also found that similar composite membrane-frames can be made when instead of Amberlite IRA 402 there are substituted other finely divided IXB such as Amberlite IRA 910, 410, 458; Lewatit M-500 (Bayer AG, Leverkusen, BRD) or Purolite A-450 (Purolite Co., Bala Cynwyd, Pa.). It is further found that similar, composite cation exchange membrane-frames can be made when instead of Amberlite IRA 402 there are substituted finely divided CXB such as Amberlite IR 118 (Na) or 200; Lewatit S-100; or Purolite C-120E.

EXAMPLE 8

Composite frame membranes are made in accordance with Example 7 except the frame portions are made from alternating layers of heterogeneous AX and CX sheet. The depleting bipolar junctions reduce by-pass current at high cell pair potential drops.

EXAMPLE 9

Composite frame membranes are made in accordance with Example 7 except the frame portions are made from sheet which has been loaded with 8% crosslinked polystyrene beads having a mesh size of 200 to 400 mesh instead of with Amberlite IRA 402. The resulting composite frame-membranes reduce by-pass current at high potential drops per cell pair.

EXAMPLE 10

The frame portion of the aluminum pattern of Example 1 is filled with a room-temperature-curing unsaturated polyester auto body putty. A microfiltration membrane sheet, as described in Example 6 is pressed into the still soft putty. After the putty has hardened the microfiltration membrane sheet is impregnated with the CXM mixture of Example 6, drained, covered and cured as described therein. The composite membrane-frame is removed from the aluminum pattern while the latter is still warm. The resulting membrane is stored in 2N sodium chloride solution.

It is found that similar composite membrane-frames can be made when the auto body putty is replaced with a two part epoxy loaded with micronic glass beads or with a resole type low temperature curing phenol formaldehyde copolymer loaded with micronic glass beads or when the CXM mixture of Example 6 is replaced with the AXM mixture of Example 1.

The frame portions of the composite membrane-frames of this example are quite hard in contrast to the more or less resilient frames of Example 6. Such hard frame-membranes may be used, for example, for the diluting compartments of non-reversing ED or filled cell ED stacks since the hard frames define the geometry of the diluting cells more certainly. The hard frames may be easily machined, if necessary, to give additional precision. When such hard frame-membranes are used for diluting compartments then resilient frame-membranes may be used for the concentrating compartments.

The integral frame in this example is roughly 3 mm thick including the margins of the microporous-sheet-reinforced CXM which margins are impregnated with the unsaturated polyester auto body putty (or other appropriate polymer as set forth above). By appropriate modification of the aluminum pattern of Example I and/or by using the (positive) aluminum frame of Example II or in other appropriate ways obvious to those skilled in the art, the thickness of the integral frame can easily be made more or less than roughly 3 mm including having a thickness about equal to that of the IXM or even less.

3.1 IMPROVED METHODS OF FILLING ED STACKS WITH ION EXCHANGE RESIN

A unit ED cell in which a CXM and an AXM are joined into a unit without frames has been described by Lacey et al., U.S. Office of Saline Water, Rep. 398 (1969); Lacey (page 15) and Nishiwaki (page 94) in "Industrial Processing with Membranes", eds. Lacey and Loeb, Wiley Interscience (1972); Garza et al., Proc. 5th Symp. on Fresh Water from the Sea, Vol. 3 (1976) page 79. The sealed unit cells did not contain IX filling. They were operated without flow of solution through the cell. Such unit cells were spaced apart between a single pair of electrodes and solution to be desalted was passed through the spaces between the unit cells. Upon passage of a direct electric current the unit cell behaved as a concentrating cell and became filled with brine as a result of both electrodialysis and electo-osmotic water transfer. Depending upon the characteristics of the membranes, the brine could have a concentration in the range of 10 to 20%. After some time of operation the current was reversed and salts were transferred out of the (completely) sealed unit cells into the flowing stream between such unit cells. The apparatus had the advantage of a single stream (instead of the two streams in normal ED or filled cell ED). It has the disadvantage of dis-continuous production of desalted product (unless more than one ED stack is used) and of serious scale formation in the non-flowing sealed unit cells. The process has not become commercial.

Desalination 24 (1978) pages 313–319 and 46 (1983) pages 291–298 disclose a modification in which the sealed unit cell has a concentrate stream outlet (but not a concentrate stream inlet). The unit cells are spaced between a single pair of electrodes as described above and operated continuously without current reversal. The spaces between the unit cells could be filled with knitted ion exchange net or by pouring in IXB. The unit cells contained thin spacers which however produced no turbulence promotion at the low concentrate effluent rate. Scaling was an even more serious problem since there was no current reversal to ameliorate such scaling.

In none of the above references did the unit cell contain IX particles or fabric.

EXAMPLE 11

Aluminum sheet about 3 mm (0.12 inches) thick is machined to a (positive) frame as shown in FIG. 1 except the outside dimensions are decreased by about 1 mm on each outside edge and the cavities are increased by about 1 mm all around so the resulting aluminum frame fits loosely into the aluminum pattern of example 1. All the edges are rounded. The aluminum frame is coated with Teflon. The aluminum pattern of Example 1 and the coated aluminum frame are heated. A piece of type PE-C-1 CXM (homogeneous, polyethylene based CXM available from the Institutes for Applied Research, Ben Gurion University of the Negev., Beersheva, Israel) is placed over the hot aluminum pattern and the hot, coated frame slowly pushed into the pattern, deforming the CXM into a pocket. The assembly is allowed to cool and the coated aluminum frame removed. The pocket membrane is removed from the pattern and holes cut corresponding to the internal manifolds. The membrane is re-inserted into the pattern. The areas near and including the entrance and exit channels and corresponding manifold holes are filled with non-woven screen as described in Example 3. The remaining cavity in the pocket is filled with a mixture of equal volumes of Dowex Marathon C cation exchange granules and Dowex Monosphere 550A anion exchange granules. ("Dowex", "Marathon" and "Monosphere" are trademarks of Dow Chemical Co., Midland, Mich.). A piece of PE-A-1 AXM also available from the above mentioned Institutes for Applied Research) is placed over the filled CXM pocket. The AXM is covered by a piece of the Mylar film described in Example 1 and the resulting structure covered by a heavy steel plate. The whole resulting structure is heated in a recirculating air oven until the surfaces of AXM and CXM which contact each other fuse together. After cooling the sealed, filled pocket is removed from the pattern, care being taken to keep it horizontal.

Figure 2:
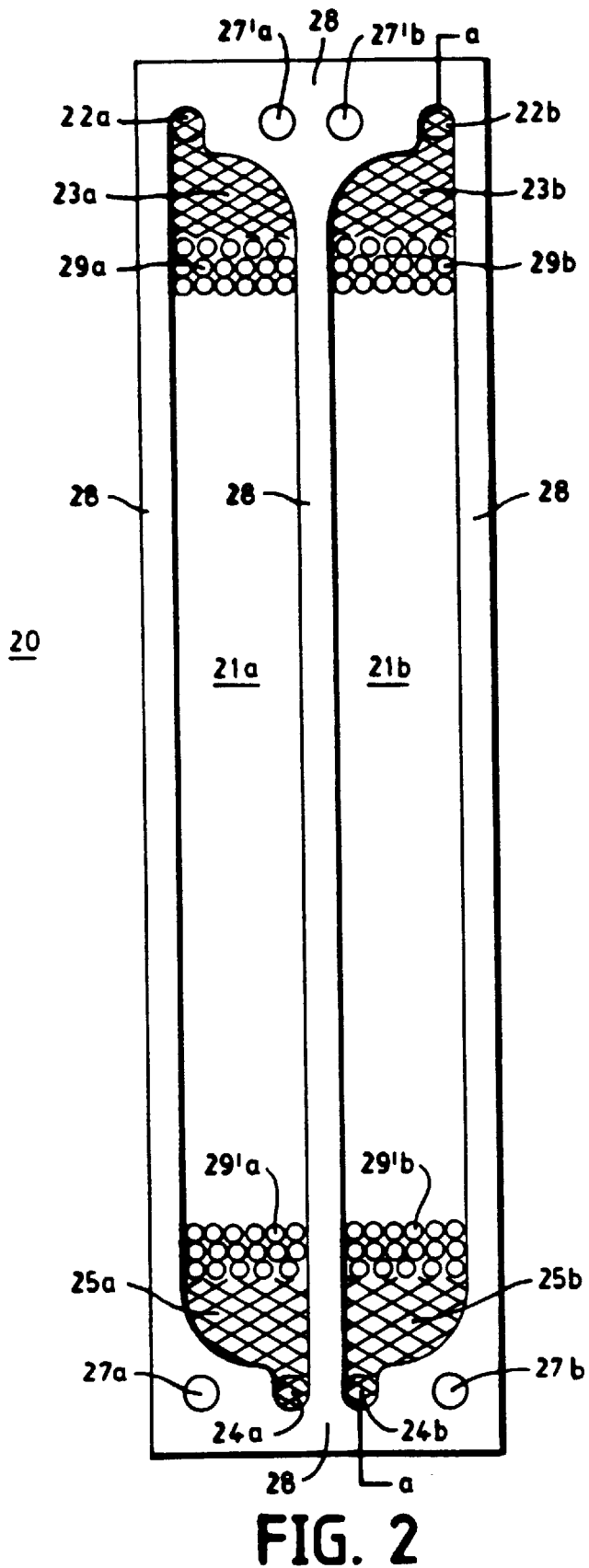
FIG. 2 is a schematic representation in plan view, not necessarily to scale, of a frame 20 and pillow(s) (or pocket(s) or packet(s)) useful in this invention, the pillow(s) containing a body (bodies) of ion exchange polymer permeable to bulk flow of fluid.

The resulting structure is essentially that represented schematically in FIG. 2 and 4. In FIG. 2, 21a and 21b represent the pockets formed by pressing one of the membranes into the pattern of FIG. 1. 23a, 23b, 25a, and 25b represent non-woven screen which confine the IXB (29a, 29b, 29'a and 29'b) to the pockets 21a and 21b and help to distribute fluid evenly through the IXB. Although 29a and 29'a respectively 29b and 29'b are shown for convenience as separated regions, it will be understood that 29a and 29'a respectively 29b and 29'b are contiguous, continuous regions from 23a to 25a and from 23b to 25b. 28 (repeated several times) represents the areas in which the AXM and CXM are joined together. In FIG. 2 such areas are shown as extending to the edges of the pattern 10 of FIG. 1. It will be clear however that it is only necessary that the joined areas be such that fluid passing from manifold aperture 22a to manifold aperture 24a and from manifold aperture 22b to manifold aperture 24b be confined to the interior of the pockets 21a and 21b.

22a, 24a, 22b and 24b represent the entrance and exit manifold apertures with which the pockets 21a and 21b are in communication. 27a, 27'a, 27b and 27'b represent manifold apertures for fluid streams by-passing pockets 21a and 21b.

Pockets, such as 21a and 21b, may also be referred to as pillows, packs, packets, purses, sacs, sacks, bags and other synonyms.

FIG. 4 is a schematic representation of a side view of the pillow(s) of FIG. 2 through section a-a. Like features in FIGS. 2 and 4 have the same numbers.

EXAMPLE 12

Hard frames, are made as in Example 10 and resilient frames as in Example 6 in each case omitting the fabric intended for IXM substrate. A five cell pair filled cell ED stack is assembled using hard frames for dilute spaces. Sealed, filled pockets made in accordance with Example 11 are placed in the dilute spaces. The concentrate spaces are filled with non-woven mesh. The electrodes and electrode spaces are as described in Example 3. The CXM of the sealed, filled pockets face the cathode. The stack is clamped together and operated as described in Example 3. The reduction in conductivity of the diluting stream is about 90%.

Note that in the stack of this example the only membranes are those from which the sealed, filled pockets (pillows) are fabricated.

At the conclusion of the test, the stack is disassembled. No significant amount of slumping of the IXB is observed and the sealed, filled pockets can be removed and replaced easily. Since loose IXB must not be removed from the stack during disassembly, such disassembly and reassembly are easy and clean.

A stack is also assembled using sealed pockets made as in Example 11 but using unreinforced film made as in Example 7. Similar performance is obtained.

A stack is also assembled in which sealed, filled pockets are also placed in the concentrate spaces, the CXM portion of such pockets contacting the CXM portion of the pockets in the dilute spaces. The AXM portion of the pockets in concentrate spaces contact the AXM portion of the pockets in the dilute spaces. The stack is operated in a 24 hour reversing type mode.

It is also found that suitable sealed, filled pockets can be made using contact adhesive, assembling first one end of the pocket around porous insert at such end, continuing the seal toward the other end, pouring in a measured, predetermined volume of appropriate IXB, inserting a second porous insert (in the areas near and including the channels and corresponding manifold holes) and finishing the seal. The resulting, sealed, filled pocket (pillow) is placed on a horizontal flat surface and the IXB smoothed out uniformly. In such case, the AXM and/or the CXM can be molded before assembly into a pocket in order to give a smoother fit into the frames. If both (or neither) AXM and CXM are molded then the appropriate spacer can be made of two plies, the edges of the pockets inserted between the plies. One ply can be resilient and the other hard. A single ply or a single frame can be hard in the interior and resilient on one or both surfaces. Although it defeats some of the advantages of the system illustrated in this example, the sealed, filled pockets can be bonded to the appropriate frame or frames or to the appropriate frame ply or plies for example by thermal welding, adhesive or non-corroding staples.

The frame of FIG. 1 contains two cavities. Individual sealed, filled pockets (bags) can be made for each cavity or (Siamese) twin pockets can be made. Larger apparatus may contain more than two cavities in which case also individual pockets can be made for each cavity, twin pockets for adjacent cavities or multiple parallel pockets for the frame as a whole.

In this example, the filling in the sealed, filled pockets has been conventional gel or macroporous beads. However short-diffusion-path ("SDP") beads may also be used. Such beads have central core which is not ion-exchange active, which core may consist of the same basis polymer as the exterior of the bead or of another polymer or may be inorganic. SPD beads may also be hollow. The filling need not be sphere shaped but can be granular, fibrous, cylindrical or have any other desired shape. The pocket can be filled with a single layer or multiple layers of long rods (filaments) parallel to the direction of flow. Many non-spherical shapes are easily made by extruding blends of polyethylene, styrene (or chloromethyl styrene or vinyl pyridine), and divinyl benzene and subsequently curing and activating or by similar extrusion of blends of polyethylene, poly styrene (or poly chloromethyl styrene or poly vinyl pyridine) and subsequently activating as disclosed by Govindan et al. (e.g. Indian J. of Technology 13, Feb. 1975, pages 76–79). Membranes suitable for making sealed, filled pockets (pillows) can also be made by such technology. Such interpolymers may also be used as binders for micronic IXB producing thereby improved (quasi-homogeneous) heterogeneous IXM.

EXAMPLE 13

A polypropylene/polyethylene non-woven fabric (FO 2450/025 from Carl Freudenberg) is swollen in a mixture of 95 parts of styrene, 4 parts of 80% divinyl benzene and 1 part of benzoyl peroxide at 60° C. for 20 minutes. The excess liquid is then drained off, subsequently blotted off with paper towelling (alternatively blown off with clean air) and the resulting fabric kept in an aqueous saturated solution of sodium sulfate at 70° C. for 6 hours. The resulting fabric is rinsed with water, dried and kept for 5 hours in a mixture of 75 parts of chlorosulfonic acid and 25 parts of carbon tetrachloride, resulting after rinsing and hydrolysis in a non-woven CX fabric. Instead of chlorosulfonic acid, the styrenated fabric may be kept in 98.3% sulfuric acid at 100° C. for 9 hours. Four grams of mercuric chloride per liter are used as a catalyst.

A similar styrenated non-woven fabric is kept in refluxing chloromethyl ether for 4 hours using tin tetrachloride as a catalyst. The chloromethylated fabric is soaked first in methanol and then for 24 hours at room temperature in a 25% solution of trimethyl amine in acetone.

EXAMPLE 14

The non-woven fabric of Example 13 is swollen in a mixture of 95 parts of vinyl benzyl chloride, 4 parts of 80% divinyl benzene and 1 part of benzoyl peroxide. Excess liquid is drained and blotted off, the swollen fabric is sandwiched between Mylar film (described in Example 1) and the resulting sandwich placed between glass plates. It is cured at 70° C. for 6 hours in a recirculating hot air oven. The resulting "chloromethyl styrenated" fabric is immersed for 24 hours at room temperature in a 25% solution of trimethyl amine in acetone.

EXAMPLE 15

The non-woven fabric of Example 13 is swollen in a mixture of 95 parts of 2-methyl-5-vinyl pyridine, 4 parts of 80% divinyl benzene and 1 part of benzoyl peroxide. The resulting swollen fabric is drained, blotted and cured as described in Example 13. It is then immersed for 24 hours at 25° C. in a solution composed of 2 parts of methyl iodide and 8 parts of methanol and then thoroughly rinsed with hydrochloric acid.

EXAMPLE 16

Sealed, filled bags (pillows) are made as described in Examples 11 and 12, using for each bag a CX porous fabric according to Example 13 and an AX porous fabric according to Examples 13, 14 and 15. The apparatus of Example 3 is disassembled and the loose IXB replaced with the sealed, filled bags of this example, care being taken that in each case the CX porous fabric of the bag is in contact with a CXM and the AX porous fabric is in contact with an AXM. The resulting stack is operated as described in Example 3, obtaining approximately the same performance.

It is found that, since the IX fabrics are porous, simplified bags can be made which bags occupy only the cavity in the frames and do not extend into the entrance channels. In this case the bags do not contain non-woven screen near the entrance and exit channels.

The resulting structure is essentially that represented schematically in FIGS. 3 and 5. In FIG. 3, 31*a* and 31*b* represent the pockets (pillows) having porous casings as in this example. 38 (repeated several times) represents the frame into which the pillows are inserted. IXB are represented by 39*a*, 39'*a*, 39*b* and 39'*b*. Although 39*a* and 39'*a* respectively 39*b* and 39'*b* are shown for convenience as separated regions, it will be understood that 39*a* and 39'*a* respectively 39*b* and 39'*b* are contiguous, continuous regions from one end of the pillows 31*a* and 31*b* to the other end. 32*a*, 34*a*, 32*b* and 34*b* represent the entrance and exit manifold apertures with which the pillows 31*a* and 31*b* are in communication through the porous casing of the pillows. 37*a*, 37?*a*, 37*b* and 37'*b* represent manifold apertures for fluid streams by-passing frame 38.

FIG. 5 is a schematic representation in side view of a pillow of FIG. 3 through section b—b. Like features in FIGS. 3 and 5 have the same number. 33*a* and 33'*a* represent the porous ion exchanging casing of pillow 31*a*.

EXAMPLE 17

Hybrid sealed, filled bags (pillows) are made using in each case either AX porous fabric and CXM or AXM and CX porous fabric. The stack of Example 12 is disassembled and the sealed, filled pockets from the dilute spaces and non-woven mesh from the concentrate spaces replaced with an alternating sequence of the hybrid bags of this example, making sure that the CXM portion of a bag is on the cathode side of each dilute space and the AXM portion (of bags having AXM) is on the cathode side of each concentrate space. In such case such CXM portion will contact the porous CX fabric of the adjacent bag and each AXM portion will contact the porous AX fabric of the bag adjacent to it. It will be clear, that in this example, separate IXM are not required. The bags of this example eliminate any problems with membrane-to-membrane contact which may be found when the sealed, filled pockets of Example 12 are used in both dilute and concentrate spaces. The stacks may be easily assembled, disassembled, inspected and reassembled in the field. In such case there seems to be some advantage to using separate pillows for each cavity in the frame.

EXAMPLE 18

Square pillows are prepared having a width and a height equal to the width of the cavity of Example 12. One side of the pillows consists of porous CX fabric prepared according to Example 13 and the other side of porous AX fabric prepared according to Examples 13, 14 or 15. The fabrics are first formed into a pocket by heat welding, then a predetermined volume of the mixed IXB used in Example 11 is put in the pocket. The open end of the pocket is then heat sealed to make a pillow. The edges of the pillows beyond the heat seals are trimmed off. The volume of IXB used is predetermined so that when the pillows are placed edge-by-edge in the cavities of Example 12 and gently flattened, the thickness of the pillows is only slightly thicker than the thickness of the cavities. The apparatus of Example 16 is disassembled and the sealed, filled bags replaced by pillows of this example, edge-to-edge, taking care that in every case the CX porous fabric of the pillow is in contact with a CXM and the AX porous fabric is in contact with an AXM and the pillows are pushed together so there appears to be little opportunity for by-pass flow around the pillows. The resulting stack is operated as described in Example 3, obtaining approximately the same performance.

It is found there is some advantage to dyeing one of the porous IX fabrics a distinctive color before assembly of the pillows, the advantage accruing from the ease in determining which side of the pillow is AX and which CX during assembly of the stack.

Disassembly and reassembly of the stack is found to be rapid and clean.

EXAMPLE 19

Square packets (pillows) are prepared as in Example 18 except each packet consists either of porous CX fabric and CXB or of porous AX fabric and AXB. The stack of Example 18 is disassembled and the packets replaced with the packets of this example, the packets alternating edge-by-edge CX by AX, the closest packet to the entrance channel being a CX pocket. The apparatus is operated at the same flow rate and voltage per cell pair as the apparatus of Example 18. Performance is approximately the same.

EXAMPLE 20

The non-woven fabric of Example 13 is immersed in a mixture of sulfuryl chloride and carbon tetrachloride (about 3:1 by volume) in the presence of 0.25% (w/w) of anhydrous aluminum chloride and kept at about 35° C. for about 8 hours in daylight. The fabric is then washed in carbon tetrachloride and hydrolyzed for about 1 hour in 5% (w/w) sodium hydroxide in water to make a CX fabric.

EXAMPLE 21

The non-woven fabric of Example 13 is immersed overnight in decalin. After draining it is illuminated in a glass walled tank in a 1:2 mixture of $Cl_2$: $SO_2$ with incandescent lamps for 5 hours. One part is hydrolyzed in 10% sodium hydroxide at 60° C. for 4 hours giving a porous CX fabric. Another part is reacted with N,N-dimethylamino-3-aminopropane at room temperature for 2 days and finally treated in a 20% solution of methyl bromide in alcohol yielding a porous AX fabric. Packets (pillows) are prepared from the porous AX or CX fabrics of this Example according to the process used in Example 19. The pockets are found to give about the same performance as the pockets of Example 19.

Figure 6:
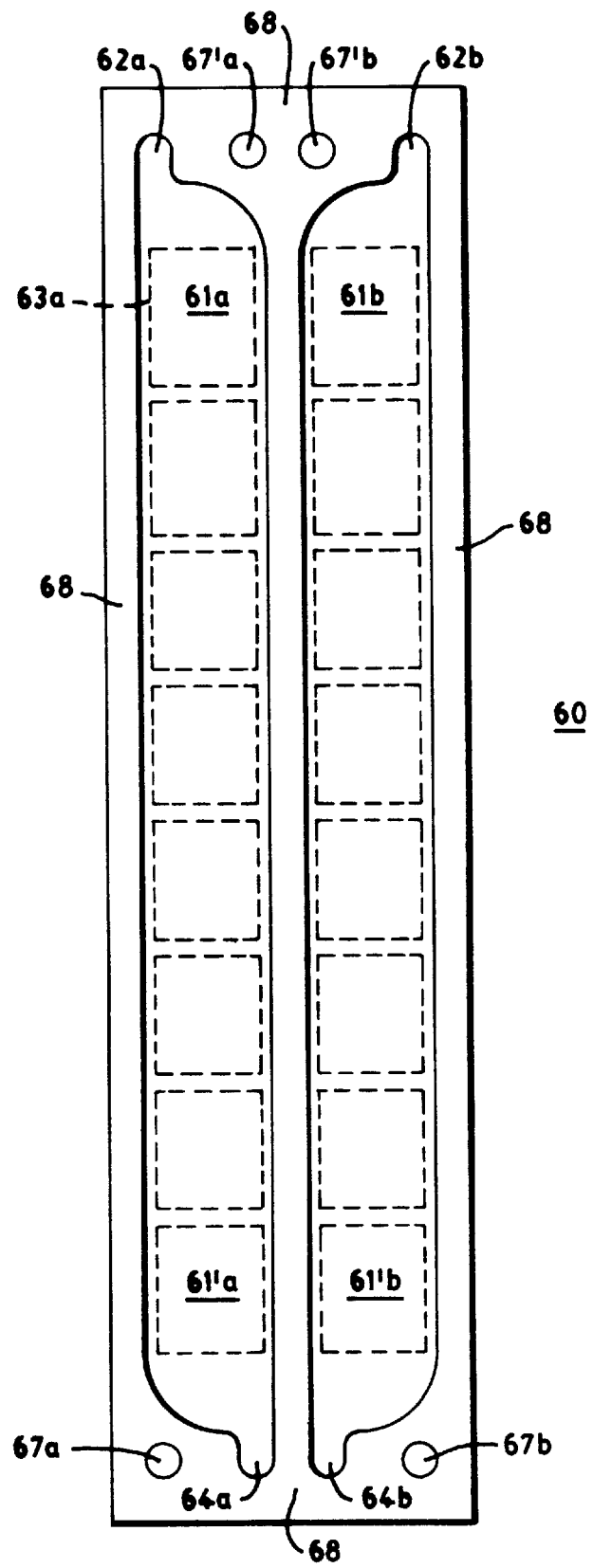
FIG. 6 is a schematic representation, not necessarily to scale of a frame 60 useful in this invention, the frame containing a multiplicity of pillows.

The structures of Examples 18, 19, 20 and 21 are essentially those represented schematically in FIG. 6. In FIG. 6, 61*a*, 61'*a*, 61*b* and 61'*b* represent pillows (packets, bags, pockets) having porous enclosures (casings, cases) as in these examples. (16 pillows in all are represented but only four are numbered). 68 (repeated several times) represents the frame into which the pillows are inserted. (Only one layer of pillows is shown. It is clear that more than one layer may be used and the arrangement of pillows in one layer may be off-set (staggered) with respect to those in another, e.g. adjacent layer. 62*a*, 64*a*, 62*b* and 64*b* represent the entrance and exit manifold apertures with which the cavities in frame 68 and the pillows are in communication, the latter through the porous envelopes of the pillows. 64*a*, 67'*a*, 67*b* and 67'*b* represent manifold apertures for fluid streams by-passing frame 68.

In Examples 18, 19, 20 and 21 the pillows are roughly square and flat, similar in construction to tea bags. It is clear that they may have other shapes, also useful, according to this invention, e.g. right parallelepipeds with the long dimension perpendicular or parallel to the general direction of flow of fluid; bodies having triangular cross-sections, fitted closely together by rotating each body 180° with respect to similar adjacent bodies. Any shape or combination of shapes may be used for the pillows which shape(s) permit(s) close packing of such pillows.

EXAMPLE 22

A five cell pair filled cell ED stack is assembled using integral, monolithic framed AXM and CXM prepared in accordance with Example 6. The thicknesses of the integral frames are about equal to those of the IXM. The end blocks are PVC into which has been milled recesses to accept electrodes. The electrodes are platinum electroplated titanium sheet. On the lower end block there are placed two ethylene-vinyl acetate copolymer frames (not having integral IXM) each about 1 mm thick. The open space in such two ply electrode frame is filled with non-woven screen except that at the ends of such frame flexible urethane foam is placed to block flow in the conduits to and from the internal manifolds. The urethane foam is slightly thicker than the two-ply electrode frame. Hydraulic connections to the flow paths of such electrode frame are made through the PVC end blocks and electrodes. The upper end block and upper electrode space are similarly constructed.

The stack is assembled using for each concentrate space one ethylene-vinyl acetate copolymer frame (not having integral IXM) about 1 mm thick and similar to those frames used to make the two ply electrode frames. For the dilute spaces three such frames are used. During assembly of the stack the concentrate spaces are filled with non-woven screens and the dilute spaces with a mixture of about 125 parts by volume of Purolite Purofine A-300 and 85 parts by volume of Purolite Purofine C-100EF by spreading such mixture uniformly over the exposed integral frame membrane. Alternatively the stack may first be assembled (with screen in the concentrate spaces) and the mixture of IXB pumped in as taught for example by U.S. Pat. Nos. 5,066,375; 5,120,416 and/or 5,203,976. The stack is tightly clamped together by means of steel end plates and threaded tie-rods. The stack is used further to demineralize the permeate from a reverse osmosis apparatus, which permeate has a pH averaging about 6 and an electrical conductivity averaging about 1 micro-Siemen/cm. The flow to each dilute space is about 10 ml/sec. The feed and outlet pressures of the concentrating and electrode streams are adjusted to minimize crossleaks. The feeds and effluents of the various classes of spaces are carried through coils of long pieces of flexible tubing in order to reduce by-pass currents. A d.c. current of about 0.5 amperes is applied to the stack. It is found that the effluent from the diluting spaces has a conductivity averaging about 0.1 micro-Siemen/cm, i.e. about a 90% reduction in conductivity.

Similar results are obtained when the three-ply dilute frames are replaced with hard frames about 3 mm thick made in accordance with Example 10 but omitting the microfiltration membrane sheet (and CXM mixture) or with resilient frames of about the same thickness made in accordance with Example 6 also omitting the microfiltration membrane sheet (and CXM mixture). Advantageously an integral, monolithic frame-AXM may be thermally or ultrasonically or by welded means of a laser to one face of the single or multiple ply dilute frame (or otherwise integrated therewith) by means of the frame of such AXM and an integral, monolithic frame-CXM similarly integrated with the other face of such dilute frame. If the dilute frame consists of more than one ply then such plies may also be welded or otherwise integrated together. The resulting monolithic AXM-dilute-frame-CXM may be filled with appropriate IXB before completing the integration or afterwards, e.g. by pumping in the IXB. Such monolithic AXM-dilute-frame-CXM containing IXB is a unit filled dilute cell (pocket, pillow, bag etc.). A filled cell electrodialysis stack made from such unit, filled, dilute cells is easy to assemble and disassemble but suffers from the disadvantage (compared to the sealed, filled pockets of Example 12) that the dilute frames must be thrown away when one or both of the IXM must be replaced. Such unit, filled, dilute cells are however easy to make since they do not require bonding of the IX resin of the integral frame IXM to the frame of the dilute space.

I claim:

1. A membrane-frame comprising a semi-permeable membrane portion having two sides and at least one frame portion, said frame portion comprising a first cavity therein, said first cavity being juxtaposed to one side of said membrane portion and adapted for fluid flow therein, said frame portion also comprising at least one first fluid entrance manifold aperture and at least one first fluid exit manifold aperture wherein said first cavity is in fluid communication with each said first fluid entrance manifold aperture and with each said first fluid exit manifold aperture, wherein said membrane portion comprises ion exchange resin having fixed charges predominantly of one sign and wherein said frame portion comprises at least in part ion exchange resin having fixed charge predominantly of the opposite sign to said on sign.

2. A membrane-frame according to claim 1 in which said semi-permeable membrane portion is a member of the group of membranes consisting of gas-separation, microfiltration, ultrafiltration, nanofiltration, reverse osmosis, diffusion dialysis, Donnan dialysis, electrodialysis, pervaporation, piezodialysis, membrane distillation, osmosis, thermo-osmosis and electrolytic membranes.

3. A membrane-frame according to claim 1 having a second frame portion comprising a second cavity therein, said second cavity juxtaposed to a second side of said membrane portion and adapted for fluid flow therein, said second frame portion further comprising at least one second fluid entrance manifold aperture and at least one second fluid exit manifold aperture, wherein said second cavity is in fluid communication with each said second entrance manifold aperture and with each second fluid exit manifold aperture.

4. A membrane-frame according to claim 1 in which said semi-permeable membrane portion is a member of the group consisting of membranes having the property of separating a gaseous mixture into less permeable and more permeable fractions, membranes having the property of separating a liquid mixture into less permeable and more permeable fractions and membranes having the property of separating a mixture of ions in solution into less permeable and more permeable fractions.

5. A membrane-frame according to claim 1 in which said frame portion is hard.

6. A membrane-frame according to claim 1 in which said frame portion is resilient.

7. A membrane-frame according to claim 1 in which said frame portion comprises a plurality of plies.

8. A membrane-frame according to claim 7 in which at least one of said plies is resilient and at least one is hard.

9. A membrane-frame according to claim 7 wherein said plies comprise at least a first ply juxtaposed to said membrane portion comprising ion exchange resin having fixed charges predominantly of the opposite sign to said one sign and at least a second ply juxtaposed to said first ply, said second ply comprising ion exchange resin having fixed charges predominantly of said one sign.

10. A membrane-frame according to claim 7 wherein said plies comprise at least a first ply juxtaposed to said membrane portion comprising ion exchange resin having fixed charges predominantly of said one sign and at least a second ply juxtaposed to said first ply, said second ply comprising ion exchange resin having fixed charges predominantly of the opposite sign to said one sign.

11. A membrane-frame according to claim 10 further comprising a membrane region having a first electrical conductance and also having two faces and a periphery, said periphery substantially encompassed by said frame portion, said frame portion consisting substantially of a material having a second electrical conductance at least an order of magnitude less than that of said first electrical conductance.

12. A membrane-frame according to claim 11, wherein said frame portion has substantially the same thickness as said membrane portion.

13. A membrane-frame according to claim 11, wherein said frame portion has a first thickness which is substantially greater than a second thickness of said membrane portion.

14. A membrane-frame according to claim 1 in which said frame portion comprises a first side juxtaposed to said membrane portion and a second side parallel to said first side, said second side juxtaposed to an electrically insulating film.

15. A membrane frame according to claim 1 in which said frame portion comprises a first side parallel to and juxtaposed to said membrane portion and a second side parallel to said first side, said second side coated with an electrically resistant film.

* * * * *